US008002970B2

(12) United States Patent
Euzen et al.

(10) Patent No.: US 8,002,970 B2
(45) Date of Patent: Aug. 23, 2011

(54) ZEOLITIC CATALYST WITH A CONTROLLED DOPING ELEMENT CONTENT, AND IMPROVED PROCESS FOR PROCESSING HYDROCARBON FEEDS

(75) Inventors: Patrick Euzen, Paris (FR); Patrick Bourges, Lyons (FR); Christophe Gueret, St. Romain en Gal (FR); Carole Bobin, Grézieu la Varenne (FR); Alexandra Chaumonnot, Lyons (FR); Hugues Dulot, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 571 days.

(21) Appl. No.: 11/722,610

(22) PCT Filed: Dec. 13, 2005

(86) PCT No.: PCT/FR2005/003138
§ 371 (c)(1),
(2), (4) Date: Apr. 28, 2008

(87) PCT Pub. No.: WO2006/070090
PCT Pub. Date: Jul. 6, 2006

(65) Prior Publication Data
US 2009/0118556 A1    May 7, 2009

(30) Foreign Application Priority Data
Dec. 23, 2004  (FR) ...................... 04 13802

(51) Int. Cl.
*C10G 47/00* (2006.01)
(52) U.S. Cl. .................. 208/111.3; 208/111.35; 208/49; 208/58; 208/59; 208/106; 208/107; 208/108; 208/109; 208/110; 208/113; 208/120.35; 208/123; 502/66; 502/64

(58) Field of Classification Search ...................... 208/55
See application file for complete search history.

(56) References Cited

U.S. PATENT DOCUMENTS

| 6,123,831 | A | 9/2000 | Benazzi et al. | |
|---|---|---|---|---|
| 6,387,246 | B1 | 5/2002 | Benazzi et al. | |
| 7,270,738 | B2 | 9/2007 | Euzen et al. | |
| 7,300,900 | B2 | 11/2007 | Benazzi et al. | |
| 2003/0089636 | A1* | 5/2003 | Marchionna et al. | 208/87 |
| 2004/0050753 | A1* | 3/2004 | Marion et al. | 208/89 |
| 2004/0138059 | A1* | 7/2004 | Euzen et al. | 208/111.3 |
| 2007/0209968 | A1* | 9/2007 | Euzen | 208/108 |

FOREIGN PATENT DOCUMENTS

| EP | 0288363 | A | 10/1988 |
|---|---|---|---|
| EP | 0980708 | A | 2/2000 |
| EP | 1415712 | A | 5/2004 |
| EP | 1462167 | A | 9/2004 |
| FR | 2793704 | A | 11/2000 |
| FR | 2863913 | A | 6/2005 |
| FR | 2863913 | A1 * | 6/2005 |

\* cited by examiner

*Primary Examiner* — Glenn A Caldarola
*Assistant Examiner* — Michelle L Stein
(74) *Attorney, Agent, or Firm* — Millen, White, Zelano & Branigan, P.C.

(57) ABSTRACT

The present invention concerns doped catalysts on a mixed zeolite/alumino-silicate support with a low macropore content, and hydrocracking/hydroconversion and hydrotreatment processes employing them. The catalyst comprises at least one hydrodehydrogenating element selected from the group formed by elements from group VIB and group VIII of the periodic table and a doping element in a controlled quantity selected from phosphorus, boron and silicon, and a support based on zeolite Y defined by a lattice parameter a of the unit cell in the range $24.40 \times 10^{-10}$ m to $24.15 \times 10^{-10}$ m and silica-alumina containing a quantity of more than 5% by weight and 95% by weight or less of silica ($SiO_2$).

30 Claims, No Drawings

ZEOLITIC CATALYST WITH A CONTROLLED DOPING ELEMENT CONTENT, AND IMPROVED PROCESS FOR PROCESSING HYDROCARBON FEEDS

FIELD OF THE INVENTION

The present invention relates to doped catalysts on supports based on silica-alumina matrices and based on zeolite Y defined by a lattice parameter a of the unit cell in the range $24.40 \times 10^{-10}$ m to $24.15 \times 10^{-10}$ m, and to hydrocracking, hydroconversion and hydrotreatment processes employing them.

The aim of the process is essentially the production of middle distillates, i.e. cuts with an initial boiling point of at least 150° C. and an end point just below the initial boiling point of residue, for example less than 340° C. or 370° C.

PRIOR ART

Hydrocracking heavy petroleum cuts is a very important refining process which can produce, from superfluous low value feeds, lighter fractions such as gasoline, jet fuel and light gas oil which the refiner needs in order to adapt production to demand. Certain hydrocracking processes can also produce a highly purified residue which can provide excellent bases for oils. Compared with catalytic cracking, the advantage of catalytic hydrocracking is that very high quality middle distillates, jet fuels and gas oils can be provided. In contrast, the gasoline produced has a much lower octane number than that from catalytic cracking.

Hydrocracking is a process which owes its flexibility to three principal elements, namely the operating conditions used, the types of catalyst employed and the fact that hydrocracking of hydrocarbon feeds may be carried out in one or two-steps.

The hydrocracking catalysts used in hydrocracking processes are all bifunctional in type, associating an acid function with a hydrogenating function. The acid function is supplied by supports with surface areas generally of 150 to 800 m$^2$/g and with a superficial acidity, such as halogenated aluminas (chlorinated or fluorinated), combinations of oxides of boron and aluminium, amorphous alumina-silicas and zeolites. The hydrogenating function is supplied either by one or more metals from group VIII of the periodic table, or by a combination of at least one metal from group VIB of the periodic table and at least one group VIII metal.

The balance between the two functions, acid and hydrogenating, is one parameter which governs the activity and selectivity of the catalyst. A weak acid function and a strong hydrogenating function produces less active catalysts, generally working at a high temperature (390-400° C. or more), and a low hourly space velocity (HSV, expressed as the volume of feed to be treated per unit volume of catalyst per hour, generally 2 or less), but endowed with very high selectivity for middle distillates. In contrast, a strong acid function and a weak hydrogenating function produce active catalysts, but they have lower selectivities for middle distillates (jet fuels and gas oils).

One conventional hydrocracking catalyst type is based on moderately acidic amorphous supports, such as alumina-silicas. Said systems are used to produce good quality middle distillates, and possibly base oils. Said catalysts are, for example, used in two-step processes.

The performance of these catalysts is closely linked to their physico-chemical characteristics, more particularly their textural characteristics. Thus and in general, the presence of macropores in catalysts comprising an alumina-silica (such as those described, for example, in U.S. Pat. No. 5,370,788) is a disadvantage. The term "macropores" means pores with a diameter of more than 500 Å. It is also advantageous to increase the packing density of catalysts to enhance their catalytic performances. In this respect, it is advantageous to use catalysts with a low total pore volume. For the same total pore volume, a better catalytic activity is thus obtained.

Similarly, the performances of said catalysts are closely correlated with their amorphous or crystalline structure. Catalysts partly comprising a zeolite or a mixture of zeolites have a higher catalytic activity than that of amorphous silica-aluminas, but have better selectivities for light products.

While good performance may be obtained by improving the textural characteristics, the performance of such catalysts is also linked to the nature of the hydrogenating phase. The hydrogenating activity will thus play a role in hydrodesulphurization (HDS) reactions, hydrodenitrogenation (HDN) reactions, hydrodearomatization (HAD) reactions and in catalyst stability.

In wishing to overcome these problems, the Applicant has surprisingly discovered that incorporation into a matrix with a reduced macropore content of certain zeolites alone or as a mixture with an improved hydrogenating function allows catalysts to be prepared which have improved catalytic performances in hydrocracking processes. It has also surprisingly discovered that adding a controlled percentage of doping elements to catalysts having such textural characteristics results in unexpected catalytic performances as regards hydrocracking/hydroconversion and in hydrotreatment.

More precisely, the invention concerns a doped hydrocracking catalyst on a support based on zeolite Y defined by a lattice parameter a of the unit cell in the range 24.40×10-10 m to 24.15×10-10 m and an alumino-silicate matrix with a reduced macropore content, and hydrocracking/hydroconversion and hydrotreatment processes employing it.

Characterization Techniques

In the following description, the term "specific surface area" means the BET specific surface area determined by nitrogen adsorption in accordance with ASTM D 3663-78 established using the BRUNAUER-EMMETT-TELLER method described in "The Journal of the American Society", 60, 309 (1938).

In the following description, the term "mercury volume" of catalyst supports means the volume measured by mercury porosimetric intrusion in accordance with ASTM D4284-83 at a maximum pressure of 4000 bars, using a surface tension of 484 dynes/cm and a contact angle for amorphous silica-alumina catalysts of 140°. The mean mercury diameter is defined as a diameter whereby all pores with a dimension smaller than said diameter constitute 50% of the pore volume ($V_{Hg}$) in an interval in the range 36 ? to 1000 ? One reason why it is preferable to use the support as a base to define the pore distribution is that the mercury contact angle varies after impregnating metals as a function of the nature and type of metals. The wetting angle is taken to be 140°, following the recommendations in the work "Techniques de l'ingénieur, traité analyse et caractérisation", pages 1050-5, by Jean Charpin and Bernard Rasneur.

For greater accuracy, the value of the mercury volume in ml/g given in the text below corresponds to the total mercury volume (total mercury volume measured by mercury porosimetry intrusion) in ml/g measured for the sample minus the value of the mercury volume in ml/g measured for the same sample for a pressure corresponding to 30 psi (about 2 bars). The mean mercury diameter is also defined, as the diameter for which all pores with a size less than this diameter constitute 50% of the total mercury pore volume.

To better characterize the pore distribution, we finally define the following criteria for the mercury pore distribution characteristics: volume V1 corresponds to the volume contained in pores for which the diameter is less than the mean diameter minus 30 Å. Volume V2 corresponds to the volume contained in pores with a diameter greater than or equal to the mean diameter minus 30 Å and less than the mean diameter plus 30 Å. Volume V3 corresponds to the volume contained in pores with a diameter greater than or equal to the mean diameter plus 30 Å. Volume V4 corresponds to the volume contained in pores with a diameter of less than the mean diameter minus 15 Å. Volume V5 corresponds to the volume contained in pores with a diameter greater than or equal to the mean diameter minus 15 Å and less than the mean diameter plus 15 Å. Volume V6 corresponds to the volume contained in pores with a diameter greater than or equal to the mean diameter plus 15 Å.

The pore distribution measured by nitrogen adsorption is determined by the Barrett-Joyner-Halenda model (BJH). The nitrogen adsorption-desorption isotherm using the BJH model is described in the periodical "The Journal of the American Society", 73, 373 (1951) by E P Barrett, L G Joyner and P P Halenda. In the description below, the term "nitrogen adsorption volume" means the volume measured for $P/P_0=0.99$, the pressure at which it is assumed that the nitrogen has filled all of the pores. The mean nitrogen desorption diameter is defined as a diameter such that all of the pores below this diameter constitute 50% of the pore volume ($V_p$) measured on the nitrogen isotherm desorption branch.

The term "surface adsorption" means the surface measured on the adsorption isotherm branch. Reference should be made to the article by A Lecloux in "Mémoires de la Société Royale des Sciences de Liège", $6^{th}$ series, volume 1, section 4, pp 169-209 (1971).

The sodium content is measured by atomic absorption spectrometry.

X ray diffraction is a technique which can be used to characterize the supports and catalysts of the invention. In the description below, the X ray analysis was carried out on powder with a Philips PW 1830 diffractometer operating in reflection mode and provided with a back monochromator using the CoKalpha radiation line ($\lambda K_{\alpha 1}$=1.7890 Å, $\lambda I K_{\alpha 2}$=1.793 Å, $K_{\alpha 1}/K_{\alpha 2}$ intensity ratio=0.5). Reference should be made to the ICDD database, number 10-0425, for the X ray diffraction diagram of gamma alumina. In particular, the 2 most intense peaks are located at a position corresponding to a d in the range 1.39 to 1.40 Å and to a d in the range 1.97 Å to 2.00 Å. The term "d" is the interplanar spacing which is deduced from the angular position using the Bragg relationship ($2d_{(hkl)}*\sin(\theta)=n*\lambda$). The term "gamma alumina" as used in the remainder of the text means, inter alia, for example, an alumina included in the group composed of cubic gamma, pseudo-cubic gamma, tetragonal gamma, low crystallinity or poorly crystallized gamma, high surface area gamma, low surface area gamma, gamma from coarse boehmite, gamma from crystalline boehmite, gamma from low crystallinity or poorly crystallized boehmite, gamma from a mixture of crystalline boehmite and an amorphous gel, gamma from an amorphous gel, and gamma developing towards delta alumina. Reference should be made to the article by B C Lippens, J J Steggerda in "Physical and Chemical Aspects of Adsorbents and Catalysts" by E G Linsen (Ed), Academic Press, London, 1970, p 171-211 for the diffraction peaks for eta, delta and theta aluminas.

For the supports and catalysts of the invention, the X ray diffraction diagram discloses a broad peak which is characteristic of the presence of amorphous silica.

Further, in the following text, the alumina compound may contain an amorphous fraction which is difficult to detect by XRD techniques. This therefore means that the alumina compounds used or described in the text may contain an amorphous fraction of a fraction with poor crystallinity.

The matrices and catalysts of the invention were analyzed by solid $^{27}$Al MAS NMR using a Brüker MSL 400 type spectrometer with a 4 mm probe. The sample rotation rate was of the order of 11 kHz. Aluminium NMR can potentially distinguish between three types of aluminium which have the following chemical displacements:

Between 100 and 40 ppm, tetra-coordinated type aluminium, $Al_{IV}$;

Between 40 and 20 ppm, penta-coordinated type aluminium, $Al_V$;

Between 20 and −100 ppm, hexa-coordinated type aluminium, $Al_{VI}$;

The aluminium atom is a quadripolar nucleus. Under certain analytical conditions (weak radiofrequency field: 30 kHz, low pulse angle: π/2 and water-saturated sample), magic angle spinning (MAS) NMR is a quantitative technique. The decomposition of MAS NMR spectra allows direct access to the quantities of the various species. The spectrum is calibrated as the chemical displacement with respect to a 1 M aluminium nitrate solution. The aluminium signal is at zero ppm. We elected to integrate the signals between 100 and 20 ppm for $Al_{IV}$ and $Al_V$, which corresponds to area 1, and between 20 and −100 for $Al_{VI}$ which corresponds to area 2. In the following description, the term "proportion of octahedral $Al_{VI}$" means the following ratio: area 2/(area 1+area 2).

The silicon environment in the alumina-silicas was studied by $^{29}$Si NMR. The tables of chemical displacement as a function of the degree of condensation were deduced from the work by G Engelhardt and D Michel: "High resolution solid-state NMR of silicates and zeolites" (Wiley), 1987.

$^{29}$Si NMR shows the chemical displacements of different species of silicon such as $Q^4$ (−105 ppm to −120 ppm), Q3 (−90 ppm to −102 ppm) and Q2 (−75 ppm to −93 ppm). Sites with a chemical displacement at −102 ppm may be sites of type Q3 or $Q^4$, which we have termed $Q3^{-4}$ sites. The sites are defined as follows:

$Q^4$ sites: Si bonded to 4Si (or Al);
$Q^3$ sites: Si bonded to 3 Si (or Al) and 1 OH;
$Q^2$ sites: Si bonded to 2 Si (or Al) and 2 OH;

The alumina-silicas of the invention are composed of silicon of types $Q^2$, $Q^3$, $Q^{3-4}$ and $Q^4$. Many species will be of type $Q^2$, approximately of the order of 10% to 80%, preferably 20% to 60% and more preferably 20% to 40%. The proportion of $Q^3$ and $Q^{34}$ species is also high, approximately of the order of 5% to 50% and preferably 10% to 40% for the two species.

The environment for the silicon atoms was studied by MAS NMR CP $^1$H->$^{29}$Si (300 MHz, rotation rate: 4000 Hz). In this case, only silicon bonded to OH bonds responds. The table of chemical displacements used was that from Kodakari et al, Langmuir 14, 4623-4629, 1998. The following attributions are made: −108 ppm ($Q^4$), −99 ppm ($Q^3/Q^4$(1 Al)), −91 ppm ($Q^3/Q^3$(1 Al)), −84 ppm ($Q^2/Q^3$(2Al)), −78 ppm ($Q^2/Q^3$(3Al)) and −73 ppm ($Q^1/Q^2$(3Al)).

The alumina-silicas of the invention are in the form of a superimposition of several masses. The principal peak of these masses is generally located at −110 ppm.

One method for characterizing the catalysts of the invention which may be used is transmission electron microscopy (TEM). To this end, an electron microscope (of the Jeol 2010 or Philips Tecnai20F type, with optional scanning) was used, provided with an energy dispersion spectrometer (EDS) for X ray analysis (for example a Tracor or Edax). The EDS detector has to allow detection of light elements. The combination of the two tools, TEM and EDS, can combine imagery and local chemical analysis with good spatial resolution.

For this type of analysis, the samples are finely ground in a mortar; the powder is then included in resin to produce ultrafine sections with a thickness of about 70 nm. Such sections are collected on copper grids coated with a film of perforated amorphous carbon acting as a support. They are then introduced into the microscope for observation and analysis under high vacuum. With imagery, the sample zones are readily distinguished from the resin zones. A certain number of analyses are then carried out, a minimum of 10, preferably in the range 15 to 30, on different zones of the industrial sample. The size of the electron beam for zone analysis (approximately determining the size of the analyzed zones) is 50 nm in diameter as a maximum, preferably 20 nm, and more preferably 10, 5, 2 or 1 nm in diameter. In scanning mode, the analyzed zone will be a function of the size of the scanned zone and not the size of the beam, which is generally less.

Semi-quantitative processing of X ray spectra recorded using the EDS spectrometer can produce the relative concentration of Al and Si (as an atomic %) and the Si/Al ratio for each of the analyzed zones. The mean $Si/Al_m$ and the standard deviation σ of this set of measurements can then be calculated. In the non limiting examples of the description which follows, the 50 nm probe was used to characterize the supports and catalysts of the invention unless otherwise indicated.

The zeolites used to prepare hydrocracking catalysts are characterized by several parameters such as the framework $SiO_2/Al_2O_3$ molar ratio, lattice parameter, pore distribution, specific surface area, sodium ion take-up capacity or water vapour adsorption capacity.

The peak ratio and the crystalline fraction are important factors. The peak ratio and crystalline fractions are determined by X ray diffraction compared with a reference zeolite using a procedure derived from the ASTM D3906-97 method "Determination of Relative X ray Diffraction Intensities of Faujasite-Containing Materials". Reference may be made to that method for the general conditions for application of the procedure, in particular for sample preparation and references.

A diffractogram is composed of characteristic lines in the crystalline fraction of the sample and a background essentially caused by diffusion of the amorphous or micro-crystalline fraction of the sample (a small diffusion signal is linked to the apparatus, air, sample holder, etc). The peak ratio of a zeolite is the ratio in a predefined angular zone (typically 8 to 40° 2θ when using the Kα copper radiation line, 1=0.154 nm), of the area of the zeolite lines (peaks) to the overall area of the diffractogram (peaks+background). This ratio, peaks/(peaks+background), is proportional to the quantity of crystalline zeolite in the material. To estimate the crystalline fraction of a sample of Y zeolite, the peak ratio of the sample is compared with that of a reference considered to be 100% crystalline (eg NaY). The peak ratio of a completely crystalline NaY zeolite is of the order of 0.55 to 0.60.

The settled packing density (SPD) is measured as described in "Applied Heterogeneous Catalysis" by J F Le Page, J Cosyns, P Courty, E Freund, J-P Franck, Y Jacquin, B Juguin, C Marcilly, G Martino, J Miquel, R Montamal, A Sugier, H Van Landehchem, Technip, Paris, 1987. A suitably sized graduated cylinder is filled by successive additions and, between two successive additions, the catalyst is settled by shaking the cylinder to constant volume. This measurement is generally carried out on 1000 $cm^3$ of catalyst packed into a cylinder with a height to diameter ratio of close to 5:1. This measurement is preferably carried out using automated apparatus such as the Autotap® sold by Quantachrome®.

The acidity of the matrix is measured by infrared spectrometry (IR). The IR spectra are recorded on a Nicolet Nexus-670 type interferometer at a resolution of 4 $cm^{-1}$ with Happ-Gensel type apodisation. The sample (20 mg) is pressed into a self-supporting pellet and placed in an in situ analytical cell (25° C. to 550° C., furnace offset from IR beam, high vacuum of $10^{-6}$ mbars). The pellet diameter is 16 mm.

The sample is pre-treated as follows to eliminate physisorbed water and to partially dehydroxylate the catalyst surface to provide an image which is representative of the catalyst acidity when in operation:

temperature rise from 25° C. to 300° C. over 3 hours;
iso-temperature for 10 hours at 300° C.;
temperature fall from 300° C. to 25° C. over 3 hours.

The basic probe (pyridine) is then adsorbed at saturated pressure at 25° C. then thermo-desorbed in the following stages:

25° C. for 2 hours under high vacuum;
100° C. for 1 hour under high vacuum;
200° C. for 1 hour under high vacuum;
300° C. for 1 hour under high vacuum.

A spectrum is recorded at 25° C. at the end of the pre-treatment and at each desorption stage in transmission mode with an accumulation time of 100 s. The spectra are recorded at iso-mass (and thus assumed to be iso-thickness) (exactly 20 mg). The number of Lewis sites is proportional to the surface area of the peak with a maximum near 1450 $cm^{-1}$, including shoulders. The number of Bronsted sites is proportional to the surface area of the peak with a maximum near 1545 $cm^{-1}$. The ratio of the number of Bronsted sites/number of Lewis sites, B/L, is estimated to be equal to the ratio of the surface areas of the two peaks described above. In general, the surface areas of the peaks at 25° C. are used. This ratio B/L is generally calculated from the spectrum recorded at 25° C. at the end of pre-treatment.

When a doping element, P and/or B and/or Si, is introduced, its distribution and location may be determined by techniques such as a Castaing microprobe (distribution profile of the various elements), a transmission electron microscope coupled to X ray analysis of the catalyst components, or by establishing a distribution map of the elements present in the catalyst by electron microprobe. These techniques can show the presence of these exogenous elements added after synthesis of the alumina-silica of the invention.

The overall composition of the catalyst may be determined by X ray fluorescence of the catalyst in the powdered state or by atomic absorption after acid attack of the catalyst.

The local composition on the micronic scale, as opposed to the overall composition of the catalyst, may be measured by electron microprobe. This measurement may be made by determining the amounts of metal in zones of a few cubic microns along the diameter of a particle of catalyst which is termed the measurement unit. This measurement allows the macroscopic distribution of the elements inside the particles to be evaluated. It may optionally be supplemented on the nanometric scale by STEM (scanning transmission electron microscopy).

The analyses are carried out using a CAMECA SX100 electron microprobe (provided with 5 wavelength dispersion spectrometers) (preferred apparatus) or optionally using a JEOL 8800R (4 spectrometers). The acquisition parameters are as follows: acceleration voltage 20 kV, current 80 or 200 nA and count time 10 s or 20 s depending on the concentration. The particles are coated in resin then polished to diameter.

It should be noted that the term "diameter" does not refer solely to a shape of a bead or extrudate, but more generally to any particle shape; it is termed the "diameter" because it is the representative length of the particle on which the measurement is made.

The measurements are made on a representative sample of the bed or catalyst batch to be used in the catalytic bed. The analyses should be carried out on at least 5 particles with at least 30 measurements per particle, uniformly distributed along the diameter.

The local concentrations (expressed as a %) of molybdenum, nickel, tungsten and phosphorus are respectively termed CMo, CNi, CW and CP.

It is also possible to express the concentrations as an atomic %; the relative fluctuations are the same.

It may be advantageous to prepare catalysts with homogeneous concentrations CMo, CNi, CW and CP along the extrudate. It is also advantageous to prepare catalysts having different core and peripheral CMo, CNi, CW and CP concentrations. These catalysts have "dished" or "domed" distribution profiles. A further distribution type is the crust type where the elements of the active phase are distributed on the surface.

DETAILED DESCRIPTION OF THE INVENTION

More precisely, the invention concerns a catalyst comprising:
- at least one hydrodehydrogenating element selected from the group formed by elements from group VIB and group VIII of the periodic table;
- 0.01% to 5.5% of a doping element selected from phosphorus, boron and silicon, preferably boron or phosphorus, and more preferably phosphorus;
- and a support based on zeolite Y defined by a lattice parameter a of the unit cell in the range $24.40 \times 10^{-10}$ m to $24.15 \times 10^{-10}$ m and based on silica-alumina containing a quantity of more than 5% by weight and 95% by weight or less of silica ($SiO_2$);

said catalyst having the following characteristics:
- a mean pore diameter, measured by mercury porosimetry, in the range 20 to 140 Å;
- a total pore volume, measured by mercury porosimetry, in the range 0.1 ml/g to 0.5 ml/g, preferably less than 0.45 ml/g and more preferably less than 0.4 ml/g;
- a total pore volume, measured by nitrogen porosimetry, in the range 0.1 ml/g to 0.5 ml/g, preferably less than 0.45 ml/g and more preferably less than 0.4 ml/g;
- a BET specific surface area in the range 100 to 600 $m^2/g$, preferably less than 500 $m^2/g$, more preferably less than 350 $m^2/g$ and still more preferably less than 250 $m^2/g$;
- a pore volume, measured by mercury porosimetry, included in pores with a diameter of more than 140 Å, of less than 0.1 ml/g;
- a pore volume, measured by mercury porosimetry, included in pores with a diameter of more than 160 Å, of less than 0.1 ml/g;
- a pore volume, measured by mercury porosimetry, included in pores with a diameter of more than 200 Å, of less than 0.1 ml/g, preferably less than 0.075 ml/g and more preferably less than 0.05 ml/g;
- a pore volume, measured by mercury porosimetry, included in pores with a diameter of more than 500 Å strictly greater than 0.01 ml/g and lower than 0.1 ml/g, preferably greater than 0.02 ml/g and lower than 0.07 ml/g and more preferably greater than 0.03 ml/g and lower than 0.07 ml/g.
- an X ray diffraction diagram which contains at least the characteristic principal peaks of at least one transition alumina included in the group composed of alpha, rho, khi, eta, gamma, kappa, theta and delta aluminas;
- a catalyst settled packing density of more than 0.75 $g/cm^3$, preferably more than 0.85 $g/cm^3$, more preferably more than 0.95 $cm^3/g$ and still more preferably more than 1.05 $g/cm^3$.

Depending on the amount of zeolite introduced, the X ray diffraction diagram of the catalyst also generally contains the characteristic principal peaks of the selected zeolite or zeolites.

The invention also concerns a hydrocracking/hydroconversion process, and a process for hydrotreatment of hydrocarbon feeds with said catalysts.

Characteristics of the Catalyst Support of the Invention

The catalyst support of the invention is a zeolitic Y defined by a lattice parameter a of the unit cell in the range $24.40 \times 10^{-10}$ m to $24.15 \times 10^{-10}$ m support based on alumina-silica (i.e. comprising alumina and silica) with a silica ($SiO_2$) content of more than 5% by weight to 95% by weight or less, preferably in the range 10% to 80% by weight, more preferably a silica content of more than 20% by weight and less than 80% by weight and still more preferably more than 25% by weight and less than 75% by weight. The silica content in the support is advantageously in the range 10% to 50% by weight.

Matrix

The non zeolitic silica-alumina based matrix used in the support for the catalyst of the invention is preferably a homogeneous alumina-silica on the micrometric scale in which the cationic impurities content (for example $Na^+$) is less than 0.1% by weight, preferably less than 0.05% by weight and more preferably less than 0.025% by weight and the anionic impurities content (for example $SO_4^{2-}$ or $Cl^-$) is less than 1% by weight, preferably less than 0.5% by weight and more preferably less than 0.1% by weight.

Thus, any alumina-silica synthesis process known to the skilled person leading to an alumina-silica which is homogeneous on the micrometric scale and in which the cationic impurities content (for example $Na^+$) may be brought down to less than 0.1% by weight, preferably less than 0.05% by weight and more preferably less than 0.025% by weight, and in which the anionic impurities content (for example $SO_4^{2-}$ or $Cl^-$) may be brought down to less than 1% by weight, preferably less than 0.05% by weight, is suitable for the preparation of the supports of the invention.

The environment of the silicon in the alumina-silicas is studied by $^{29}Si$ NMR. The alumina-silicas of the invention are composed of silicon of types $Q^2$, $Q^3$, $Q^{3-4}$ and $Q^4$. Many species will be of type $Q^2$, approximately of the order of 10% to 80%, preferably 20% to 60% and more preferably 30% to 50%. The proportion of $Q^3$ and $Q^{3-4}$ species is also high, approximately of the order of 5% to 50% and preferably 10% to 40% for the two species.

The environment for the silicon atoms was studied by MAS NMR CP $^1H$->$^{29}Si$ (300 MHz, spin rate: 4000 Hz). In this case, only silicon bonded to OH bonds responds. The table of chemical displacements used was that from Kodakari et al, Langmuir 14, 4623-4629, 1998. The following attributions are made: −108 ppm ($Q^4$), −99 ppm ($Q^3/Q^4$(1 Al)), −91 ppm ($Q^3/Q^3$(1Al)), −84 ppm ($Q^2/Q^3$(2Al)), −78 ppm ($Q^2/Q^3$(3Al)) and −73 ppm ($Q^1/Q^2$(3Al)).

The alumina-silicas of the invention are in the form of a superimposition of several masses. The principal peak of these masses is generally located at −110 ppm.

Solid $^{27}$Al MAS NMR spectra of the supports and catalysts of the invention exhibit two distinct peak masses. A first type of aluminium with a maximum resonating at about 10 ppm extends between −100 and 20 ppm. The position of the maximum suggests that these species are essentially of the $Al_{VI}$ type (octahedral). A second minor type of aluminium with a maximum resonating at about 60 ppm extends between 20 and 110 ppm. This can be differentiated into at least two species. The predominant species here corresponds to $Al_{IV}$ atoms (tetrahedral). For the catalysts used in the process of the present invention, advantageously, the proportion of octahedral $Al_{VI}$ is more than 50%, preferably more than 60%, and more preferably more than 70%.

In one implementation of the invention, the catalyst contains a matrix comprising at least two alumino-silicate zones, said zones having Si/Al ratios which are higher or lower than the overall Si/Al ratio determined by X ray fluorescence. Thus, a catalyst having a Si/Al ratio of 0.5 comprises two alumino-silicate zones, one zone with a Si/Al ratio determined by TEM of less than 0.5 and the other zone with a Si/Al ratio determined by TEM in the range 0.5 to 2.5.

In a further implementation of the invention, the catalyst contains a single alumina-silica zone, said zone having a Si/Al ratio equal to the overall Si/Al ratio determined by X ray fluorescence and less than 2.3.

Zeolite

The zeolite of the invention is characterized by a lattice parameter a of the unit cell in the range $24.40 \times 10^{-10}$ m to $24.15 \times 10^{-10}$ m and preferably in the range of $24.38 \times 10^{-10}$ m et $24.24 \times 10^{-10}$ m.

The total weight content of zeolite in the catalyst is generally in the range 0.1% to 30%, advantageously in the range 0.2% to 25%, preferably in the range 0.3% to 20%, more preferably in the range 0.5% to 20% and still more preferably in the range 1% to 10%.

Depending on the amount of zeolite introduced, the X ray diffraction diagram of the support or the catalyst will also generally contain the characteristic principal peaks of the zeolite or zeolites selected.

The zeolite of the invention can also be a Y zeolites which have undergone a secondary treatment, such as: USY, VUSY, SDUSY.

The Y zeolite used in the catalyst supports of the invention is at least partially in its hydrogen or acid form (H+) or ammonium (NH$_4$+) or cationic form, said cation being selected from the group formed by groups IA, IB, IIA, IIB, IIIA, IIIB (including the rare earths), Sn, Pb and Si; it is preferably at least partially in its H+ form or it may also be used at least in part in its cationic form (as defined above).

The acidity of the support (matrix+zeolite) of the invention may advantageously, and without limiting the scope of the invention, be measured by IR monitoring of the thermodesorption of pyridine. In general, the ratio B/L, as described above, of the support of the invention is over 0.7, preferably over 0.125, and more preferably over 0.25.

Characteristics of Catalyst of the Invention

The catalyst of the invention thus comprises:
- a support based on zeolite Y defined by a lattice parameter a of the unit cell in the range $24.40 \times 10^{-10}$ m to $24.15 \times 10^{-10}$ m and based on alumina-silica (i.e. comprising alumina and silica) with a silica content ($SiO_2$) of more than 5% by weight to 95% or less, preferably in the range 10% to 80% by weight, preferably a silica content of more than 20% by weight to less than 80% by weight and more preferably of more than 25% by weight to less than 75% by weight; the silica content is advantageously in the range 10% to 50% by weight;

preferably, a cationic impurities content of less than 0.1% by weight, preferably less than 0.05% by weight and more preferably less than 0.025% by weight. The term "cationic impurities content" means the total alkali content;

preferably, an anionic impurities content of less than 1% by weight, more preferably less than 0.5% by weight and still more preferably less than 0.1% by weight;

at least one hydrodehydrogenating element selected from the group formed by elements from group VIB and group VIII of the periodic table;

preferably, a group VIB metal(s) content, in the metallic form or in the oxide form, in the range 1 to 55% by weight, preferably in the range 1.5% to 35% by weight, more preferably in the range 1.5% to 30% by weight;

preferably, a group VIII metals content, in the metallic form or in the oxide form, in the range 0.1% to 30% by weight, preferably 0.2% to 25% and more preferably in the range 0.2% to 20% by weight;

at least one doping element deposited on the catalyst (the term "doping element" means an element introduced after preparing the alumino-silicate support described above) and selected from the group formed by phosphorus, boron and silicon, preferably phosphorus and/or boron and more preferably phosphorus. The phosphorus, boron, silicon contents, calculated by weight in their oxide form, are in the range 0.01% to 5.5%, preferably in the range 0.5% to 2.5%, more preferably in the range 4% to 5%;

optionally, at least one group VIIB element (preferably manganese, for example), and a content in the range 0 to 20% by weight, preferably in the range 0 to 10% by weight of the compound in the oxide or metallic form;

optionally, at least one group VB element (preferably niobium, for example), and a content in the range 0 to 40% by weight, preferably in the range 0 to 20% by weight of the compound in the oxide or metallic form;

a mean pore diameter, measured by mercury porosimetry, in the range 20 to 140 Å, preferably in the range 40 to 120 Å and more preferably in the range 50 to 100 Å;

preferably, a ratio between the volume V2, measured by mercury porosimetry, in the range $D_{mean}$−30 Å to $D_{mean}$+30 Å, to the total pore volume, also measured by mercury porosimetry, of more than 0.6, preferably more than 0.7 and still more preferably more than 0.8;

preferably, a volume V3 included in pores with diameters of more than $D_{mean}$+30 Å, measured by mercury porosimetry, of less than 0.1 ml/g, preferably less than 0.06 ml/g and more preferably less than 0.04 ml/g;

preferably, a ratio between the volume V5 included between $D_{mean}$−15 Å and $D_{mean}$+15 Å, measured by mercury porosimetry, and the volume V2 included between $D_{mean}$−30 Å and $D_{mean}$+30 Å, measured by mercury porosimetry, of more than 0.6, preferably more than 0.7 and more preferably more than 0.8;

preferably, a volume V6 included in pores with diameters of more than $D_{mean}$+15 Å, measured by mercury porosimetry, of less than 0.2 ml/g, preferably less than 0.1 ml/g and more preferably less than 0.05 ml/g;

a total pore volume, measured by mercury porosimetry, in the range 0.1 ml/g to 0.5 ml/g, preferably less than 0.45 ml/g and more preferably less than 0.4 ml/g;

a total pore volume, measured by nitrogen porosimetry, in the range 0.1 ml/g to 0.5 ml/g, preferably less than 0.45 ml/g and more preferably less than 0.4 ml/g/;

a BET specific surface area in the range 100 to 600 m²/g, preferably less than 500 m²/g, more preferably less than 350 m²/g and still more preferably less than 250 m²/g;

preferably, an adsorption surface area such that the ratio between the adsorption surface area and the BET specific surface area is more than 0.5, preferably more than 0.65 and more preferably more than 0.8;

a pore volume, measured by mercury porosimetry, included in pores with diameters of more than 140 Å, of less than 0.1 ml/g, preferably less than 0.07 ml/g and more preferably less than 0.05 ml/g;

a pore volume, measured by mercury porosimetry, included in pores with diameters of more than 160 Å, of less than 0.1 ml/g, preferably less than 0.07 ml/g and more preferably less tan 0.05 ml/g/ a pore volume, measured by mercury porosimetry, included in pores with a diameter of more than 200 Å, of less than 0.1 ml/g, preferably less than 0.075 ml/g and more preferably less than 0.05 ml/g;

a pore volume, measured by mercury porosimetry, include din pores with a diameter of more than 500 Å, strictly greater than 0.01 ml/g and lower than 0.1 ml/g, preferably greater than 0.02 ml/g and lower than 0.07 ml/g and preferably greater than 0.03 ml/g and lower than 0.07 ml/g;

an X ray diffraction diagram which contains at least the characteristic principal peaks of at least one of the transition aluminas comprised in the group composed of rho, khi, kappa, eta, gamma, theta and delta aluminas, preferably containing at least the characteristic principal peaks of at least one of the transition aluminas comprised in the group composed of gamma, eta, theta and delta aluminas, still more preferably containing peaks with a d in the range 1.39 to 1.40 Å and with a d in the range 1.97 Å to 2.00 Å.

A cat settled packing density of more than 0.75 g/cm³, preferably more than 0.85 g/cm³, more preferably more than 0.95 g/cm³ and still more preferably more than 1.05 g/cm³.

The total weight content of zeolite in the catalyst is generally in the range 0.1% to 30%, advantageously in the range 0.2% to 25%, preferably in the range 0.3% to 20%, more preferably in the range 0.5% to 20%, and still more preferably in the range 1% to 10%.

Depending on the amount of zeolite introduced, the X ray diffraction diagram of the catalyst also generally contains the characteristic principal peaks of the selected zeolite or zeolites.

The zeolite of the invention can also be a Y zeolites which have undergone a secondary treatment, such as: USY, VUSY, SDUSY.

The zeolite of the invention is characterized by a lattice parameter a of the unit cell in the range $24.40 \times 10^{-10}$ m to $24.15 \times 10^{-10}$ m and preferably in the range of $24.38 \times 10^{-10}$ m et $24.24 \times 10^{-10}$ m.

The Y zeolite used in the catalyst supports of the invention is at least partially in its hydrogen or acid form (H+) or ammonium ($NH_4$+) or cationic form, said cation being selected from the group formed by groups IA, IB, IIA, IIB, IIIA, IIIB (including the rare earths), Sn, Pb and Si; it is preferably at least partially in its H+ form or it may also be used at least in part in its cationic form (as defined above).

When the doping element is phosphorus, the phosphorus content is advantageously in the range 0.01% to 5.5% by weight of oxide, more preferably in the range 0.5% to 2.5% by weight of oxide and even more preferably in the range 4% to 5% by weight.

Preferably, the catalyst is based on molybdenum and tungsten and/or nickel and tungsten.

A preferred catalyst of the invention comprises the nickel-tungsten combination and a phosphorus content in an amount in the range 0.01% to 4% by weight of oxide.

A highly preferred catalyst of the invention comprises a nickel-tungsten combination and a phosphorus content in the range 0.01% to 2.5% by weight of oxide.

The catalyst may also contain a minor proportion of at least one stabilizing element selected from the group formed by zirconium and titanium.

The catalyst of the invention has better activity without loss of selectivity for middle distillates. Without wishing to be bound by a particular theory, it appears that said particularly high activity with no notable loss of selectivity in the catalysts of the present invention is due to a synergistic effect between the zeolite, the silica-alumina matrix and the improved hydrogenating phase.

Standard Activity Test: Evaluation of Catalysts of the Invention

The acidity and hydrogenation performance of the catalysts of the invention may be evaluated by a catalytic test on a mixture of model molecules: the hydrogenation of toluene and the isomerization of cyclohexane.

The catalytic test to monitor catalyst hydrogenation and acidity is carried out in accordance with the following protocol:

The catalysts are sulphurized in situ, dynamically, in a tube reactor with a fixed traversed bed, in a catatest type pilot unit (Vinci Technologies), the fluids moving from top to bottom. The hydrogenating and isomerizing activity measurements are carried out immediately after sulphurization under pressure without letting in air, using the hydrocarbon feed employed to sulphurize the catalysts.

The sulphurization and test feed is composed of 5.8% of dimethyldisulphide (DMDS), 20% of toluene and 74.2% of cyclohexane, by weight. The stabilized catalytic activities of equal volumes of catalyst in the toluene hydrogenation reaction are then measured. The isomerization of cyclohexane, a toluene diluent, is monitored to estimate the acidity of the catalysts.

The conditions for measuring the activity are as follows (assuming total vaporization and the perfect gas law):

Total pressure: 6.0 MPa
Toluene pressure: 0.38 MPa
Cyclohexane pressure: 1.55 MPa
Hydrogen pressure: 3.64 MPa
$H_2S$ pressure: 0.22 MPa
Catalyst volume: 40 cc
Feed flow rate: 80 cc/h
Hourly space velocity: 2 l/l/h$^{-1}$
Hydrogen flow rate: 36 l/h
Sulphurization and test temperature: 350° C. (3° C./min).

Liquid effluent samples were analyzed by gas chromatography. Determination of the molar concentrations of unconverted toluene (T) and the concentrations of the hydrogenation products: methyl cyclohexane (MCC6), ethyl cyclopentane (EtCC5) and dimethyl cyclopentane (DMCC5) allowed the degree of toluene hydrogenation to be calculated, $X_{HYD}$, defined as:

$$X_{HYD}(\%)=100*(MCC6+EtCC5+DMCC5)/(T+MCC6+EtCC5+DMCC5)$$

The degree of cyclohexane isomerization $X_{ISO}$ is calculated in the same manner from the concentrations of unconverted cyclohexane and its reaction product, methyl cyclopentane. Since the toluene hydrogenation and cyclohexane isomerization reactions are first order under our test conditions and the reactor behaves as an ideal plug reactor, the hydrogenating activity $A_{HYD}$ and isomerization activity $A_{ISO}$ for the catalysts are calculated using the formula: $Ai=\ln(100/(100-X_i))$ Advantageously, the catalyst of the invention in the standard activity test has an activity $A_{HYD}>0.7$, preferably $A_{HYD}>0.9$ more preferably $A_{HYD}>1.2$, and still more preferably $A_{HYD}>1.4$.

Preparation Processes

The catalysts of the invention may be prepared using any method known to the skilled person.

Preparation Methods

Matrix

The Applicant has discovered that zeolitic supports Y having a lattice parameter a of the unit cell in the range $24.40 \times 10^{-10}$ m to $24.15 \times 10^{-10}$ m based on silica-alumina catalysts obtained by mixing, at any stage, an alumina compound which is partially soluble in an acidic medium with a silica compound which is completely soluble or with a completely soluble combination of alumina and hydrated silica, then shaping, followed by hydrothermal or thermal treatment to homogenize it on a micrometric scale or even on a nanometric scale, can produce a catalyst which is particularly active in hydrocracking processes. The term "partially soluble in an acidic medium" as used by the Applicant means that contact of the alumina compound prior to adding the (generally completely soluble) silica compound or the combination with an acidic solution, for example nitric acid or sulphuric acid, causes partial dissolution.

Silica Sources

The silica compounds used in accordance with the invention may be selected from the group formed by silicic acid, silicic acid sols, hydrosoluble alkaline silicates, cationic silicon salts, for example hydrated sodium metasilicate, Ludox® in its ammoniacal or alkaline form, or quaternary ammonium silicates. The silica sol may be prepared using any method known to the skilled person. Preferably, a solution of decationized orthosilicic acid is prepared from a hydrosoluble alkaline silicate by ion exchange over a resin.

Sources of Completely Soluble Silica-Aluminas

The soluble hydrated silica-aluminas used in the invention may be prepared by true co-precipitation under controlled stationary operating conditions (pH, concentration, temperature, mean residence time) by reacting a basic solution containing silicon, for example in the form of sodium silicate, optionally of aluminium, for example in the form of sodium aluminate, with an acidic solution containing at least one aluminium salt, for example aluminium sulphate. At least one carbonate or $CO_2$ may optionally be added to the reaction medium.

The term "true co-precipitation" as used by the Applicant means a process in which at least one aluminium compound which is completely soluble in a basic medium or in an acidic medium as described above, and at least one silicon compound as described above, are brought into contact, simultaneously or sequentially, in the presence of at least one precipitating and/or co-precipitating compound to obtain a mixed phase which is essentially constituted by hydrated silica-alumina which is optionally homogenized by intense agitation, shear, colloidal milling or by a combination of these individual operations. As an example, these hydrated silica-aluminas may have been prepared as described in the following American patents: U.S. Pat. No. 2,908,635; U.S. Pat. No. 3,423,332; U.S. Pat. No. 3,433,747; U.S. Pat. No. 3,451,947; U.S. Pat. No. 3,629,152 and U.S. Pat. No. 3,650,988.

Complete dissolution of the silica compound or the combination is determined approximately using the following method. A fixed quantity (15 g) of the silica compound or the hydrated combination is introduced into a medium at a fixed pH. Preferably, the concentration of solid with respect to a litre of suspension is 0.2 moles per litre. The pH of the dispersion solution is at least 12 and may be obtained using an alkaline source. Preferably, NaOH is advantageously used. The mixture is then mechanically stirred using a deflocculating turbine agitator for 30 minutes at 800 rpm. Once agitation is complete, the mixture is centrifuged for 10 minutes at 3000 rpm. The cake is separated from the supernatant liquid. The solution is filtered through a filter with a pore size of 4 and a diameter of 19 cm. Drying is then carried out followed by calcining the 2 fractions at 1000° C. A ratio R is then determined by dividing the decanted mass by the mass of solid in suspension. The term "completely soluble" is applied to a ratio R of at least 0.9.

Sources of Alumina

The alumina compounds used in the invention are partially soluble in an acidic medium. They are completely or partially selected from the group of alumina compounds with general formula $Al_2O_3.n\ H_2O$. In particular, hydrated alumina compounds may be used, such as: hydrargillite, gibbsite, bayerite, boehmite, pseudo-boehmite and amorphous or essentially amorphous alumina gels. It is also possible to use dehydrated forms of said compounds which are constituted by transition aluminas and which comprise at least one of the phases in the following group: rho, khi, eta, gamma, kappa, theta, delta, which essentially differ from each other by the organization of their crystalline structure. Alpha alumina, commonly termed corundum, may be incorporated into the catalyst of the invention in small proportions.

This partial dissolution property is an important property of the invention, and is applicable to hydrated alumina powders, to spray dried hydrated alumina powders, to dispersions or suspensions of hydrated alumina or to any combination thereof, prior to any addition of a compound containing all or part of the silicon.

The partial dissolution of the alumina compound is evaluated as follows. A precise quantity of the powdered alumina compound or suspended alumina compound is introduced into a medium at a predetermined pH. The mixture is then mechanically stirred. Once agitation is complete, the mixture is left without agitation for 24 hours. Preferably, the concentration of solid $Al_2O_3$ with respect to one litre of suspension is 0.5 moles per litre. The pH of the dispersion solution is 2 and is obtained either by using $HNO_3$ or HCl or $HClO_4$. Preferably, $HNO_3$ is used. The distribution of sedimented and dissolved fractions is monitored by assaying the aluminium by UV absorption. The supernatants are ultrafiltered (polyethersulphone membrane, Millipore NMWL 30000) and digested in concentrated acid. The quantity of aluminium in the supernatant corresponds to the non-sedimented alumina compound and to the dissolved aluminium, and the ultrafiltered fraction corresponds to the dissolved aluminium alone. The quantity of sedimented particles is deduced from the theoretical concentration of aluminium in the dispersion (assuming that all of the solid which has been introduced is dispersed) and the quantities of boehmite actually dispersed and the aluminium in solution.

The alumina precursors used in the present invention are thus distinguished from those used in the case of true co-precipitation, which are entirely soluble in an acidic medium: cationic alumina salts, for example aluminium nitrate. The methods of the invention are distinguished from true co-precipitations since one of the elements, in this case the aluminium compound, is partially soluble.

To use the alumina, any compound of alumina with general formula $Al_2O_3.nH_2O$ may be used. Its specific surface area is in the range 150 to 600 $m^2/g$. In particular, it is possible to use hydrated alumina compounds such as: hydrargillite, gibbsite, bayerite, boehmite, pseudo-boehmite and amorphous or essentially amorphous alumina gels. It is also possible to use dehydrated forms of said compounds which are constituted by transition aluminas and which comprise at least one of the phases in the group: rho, khi, eta, gamma, kappa, theta, delta and alpha, which differ essentially in their crystalline structures. During heat treatments, these various forms may interchange in a complex sequence which depends on the operating conditions of the treatment. It is also possible to use small amounts of alpha alumina, commonly known as corundum.

More preferably, the aluminium hydrate $Al_2O_3.nH_2O$ used is boehmite, pseudo-boehmite and amorphous or essentially amorphous alumina gels. A mixture of said products in any combination may also be used.

Boehmite is generally described as an aluminium monohydrate with formula $Al_2O_3,nH_2O$ which encompasses a wide range of materials with varying degrees of hydration and organization the distinctions between which may be blurred: the most hydrated gelatinous boehmite, in which n may be greater than 2, pseudo-boehmite or micro-crystalline boehmite in which n is in the range 1 to 2, then crystalline boehmite and finally boehmite properly crystallized into large crystals with n close to 1. The morphology of aluminium monohydrate may vary widely between the two limiting forms, acicular and prismatic. A whole series of various forms may be used between these two forms: chains, boats, interlaced plates.

The preparation and/or shaping of aluminium hydrate may thus constitute the first step in preparing these catalysts. Many patents relate to the preparation and/or shaping of supports based on transition alumina from aluminium monohydrate: U.S. Pat. No. 3,520,654, U.S. Pat. No. 3,630,670, U.S. Pat. No. 3,864,461, U.S. Pat. No. 4,154,812, U.S. Pat. No. 4,313,923, DE U.S. Pat. No. 3,243,193 and U.S. Pat. No. 4,371,513.

Relatively pure aluminium hydrates may be used in the form of powders, which may be amorphous or crystalline, or crystalline containing an amorphous part. The aluminium hydrate may also be introduced in the form of aqueous suspensions or dispersions. The aqueous aluminium hydrate suspensions or dispersions employed in accordance with the invention may be capable of being gelled or coagulated. The aqueous dispersions or suspensions may also be obtained, as is well known to the skilled person, by peptization of aluminium hydrates in water or acidulated water.

The aluminium hydrate dispersion may be produced by any process which is known to the skilled person: in a batch reactor, a continuous mixer, a grinder, or a colloidal mill. Such a mixture may also be produced in a plug flow reactor and in particular in a static mixer. "Lightnin" reactors can be cited.

Further, the source of alumina may also be an alumina which has already undergone a treatment which can improve its degree of dispersion. As an example, it is possible to improve the dispersion of the alumina source by a preliminary homogenization treatment. The term "homogenization" means at least one of the homogenization treatments described in the text below.

The aqueous dispersions or suspensions of alumina which may be used are fine or ultrafine aqueous suspensions or dispersions of boehmites which are composed of particles with colloidal dimensions.

The fine or ultrafine boehmites used in accordance with the present invention may in particular have been obtained in accordance with patents FR-A-1 261 182 and FR-A-1 381 282 or European patent application EP-A-0 015 196.

It is also possible to use aqueous suspensions or dispersions obtained from pseudo boehmite, amorphous alumina gels, aluminium hydroxide gels or ultrafine hydrargillite gels.

Aluminium monohydrate may be purchased from a variety of commercial sources of alumina such as PURAL®, CATAPAL®, DISPERSAL®, DISPAL® sold by SASOL, or HIQ® sold by ALCOA, or using methods which are known to the skilled person: it may be prepared by partial dehydration of aluminium trihydrate using conventional methods, or it may be prepared by precipitation. When said aluminas are in the form of a gel, they are peptized by water or an acidulated solution. For precipitation, the source of the acid may, for example, be at least one of the following compounds: aluminium chloride, aluminium sulphate or aluminium nitrate. The source of basic aluminium may be selected from basic aluminium salts such as sodium aluminate or potassium aluminate.

Examples of precipitating agents which may be used are sodium hydroxide, sodium carbonate, potassium hydroxide and ammonia. The precipitating agents are selected so that the alumina source of the present invention and its agents are precipitated together.

Depending on the acidic or basic nature of the starting aluminium-based compound, the aluminium hydrate is precipitated using a base or an acid selected, for example, from hydrochloric acid, sulphuric acid, sodium hydroxide or a basic or acidic aluminium compound such as those cited above. The two reagents may be aluminium sulphate and sodium aluminate. As an example, the preparation of aluminium alpha-monohydrate using aluminium sulphate and sodium aluminate is described in U.S. Pat. No. 4,154,812.

Pseudo- boehmite may be prepared using the process described in U.S. Pat. No. 3,630,670 by reacting an alkaline aluminate solution with a mineral acid solution. Pseudo- boehmite may be prepared using the process described in U.S. Pat. No. 3,630,670 by reacting an alkaline aluminate solution with a mineral acid solution. It may also be prepared as described in FR-A-1 357 830.

Amorphous alumina gels may be prepared using the processes described in the article "Alcoa Paper No 19 (1972)", pages 9 to 12, and in particular by reacting an acid aluminate or an aluminium salt, by hydrolysis of aluminium alcoholates or by hydrolysis of basic aluminium salts.

The aluminium hydroxide gels may those prepared using the processes described in U.S. Pat. No. 3,268,295 and U.S. Pat. No. 3,245,919.

The aluminium hydroxide gels may also be those prepared using the processes described in WO-A-00/01617, by mixing a source of acidic aluminium and a base or a source of basic aluminium and an acid to precipitate an alumina monohydrate, the subsequent steps being:

2—maturation;
3—filtration;
4—washing; and
5—drying, these processes being characterized in that the mixing in step one is carried out without back-mixing.

Ultrafine hydrargillite may be prepared using the process described in U.S. Pat. No. 1,371,808, by heating, to a temperature in the range from ambient temperature to 60° C., alumina gels in the form of a cake and containing 0.1 monovalent acid ions with respect to the alumina, expressed as $Al_2O_3$ molecules.

It is also possible to use aqueous suspensions or dispersions of ultrapure boehmite or pseudo-boehmite prepared using a process in which an alkaline aluminate is reacted with a carbonic anhydride to form a precipitate of amorphous aluminium hydroxycarbonate, separating the precipitate obtained by filtering then washing it (the process has been described in U.S. Pat. No. 3,268,295).

Subsequently,
a) in a first step, the washed amorphous aluminium hydroxycarbonate precipitate is mixed with a solution of an acid, a base or a salt or a mixture thereof; this mixture is made by pouring the solution onto the hydroxycarbonate, the pH of the medium so constituted being less than 11;
b) in a second step, the reaction mixture is heated to a temperature of less than 90° C. for a time of at least 5 minutes; and
c) in a third step, the medium resulting from the third step is heated to a temperature in the range 90° C. to 250° C.

The boehmite and pseudo-boehmite dispersions or suspensions obtained using this process have an alkali content of less than 0.005% expressed in the form of the ratio of the alkali metal oxide/$Al_2O_3$.

When very pure catalyst supports are to be made, ultrapure suspensions or dispersions of boehmites or pseudo-boehmites are preferably used, obtained using the process described above, or aluminium hydroxide gels which have been prepared by hydrolysis of aluminium alcoholates using a process of the type described in U.S. Pat. No. 2,892,858.

We shall now summarize the production process which produces such boehmite type aluminium hydroxide gels, obtained as a by-product in the production of alcohol by hydrolysis of an aluminium alcoholate or alkoxide (Ziegler synthesis). Ziegler alcohol synthesis reactions have been described in particular in U.S. Pat. No. 2,892,858. In that process, triethylaluminium is initially prepared from aluminium, hydrogen and ethylene, the reaction being carried out in two-steps with a partial recycle of the triethylaluminium.

Ethylene is added in the polymerization step and the product obtained is then oxidized to aluminium alcoholate, the alcohols being obtained by hydrolysis.

The aluminium hydroxide gels may also be those which are prepared in accordance with the processes described in U.S. Pat. No. 4,676,928 and U.S. Pat. No. 6,030,599.

The hydrated alumina obtained as a by-product of the Ziegler reaction is that described in a bulletin from CONOCO dated 19 Jan. 1971.

The dimensions of the alumina particles constituting the alumina source may vary widely. They are generally in the range 1 to 100 microns.

Matrix Preparation Methods

The matrix may advantageously be prepared using one of the methods described below.

As an example, one method for preparing a silica-alumina of the invention consists of preparing a solution of orthosilicic acid ($H_2SiO_4$, $H_2O$) decationized from a hydrosoluble alkaline silicate by ion exchange then simultaneously adding it to a cationic aluminium salt in solution, for example the nitrate, and to ammonia under controlled operating conditions; or adding the orthosilicic acid solution to the cationic aluminium salt in solution and co-precipitating the solution obtained with ammonia under controlled operating conditions, resulting in a homogeneous product. This silica-alumina hydrogel is mixed with an aluminium hydrate powder or suspension. After filtering and washing, drying with shaping and then calcining, preferably in air, in a rotary furnace, at high temperature and for a time sufficient to encourage interactions between alumina and silica, generally at least 2 hours, a catalyst with the characteristics of the invention is obtained.

Another method for preparing the silica-alumina of the invention consists of precipitating the alumina hydrate as above, filtering and washing it, then mixing it with aqueous orthosilicic acid to obtain a suspension, which is intimately homogenized by strong agitation and shearing. An Ultraturrax turbine or a Staro turbine may be used, or a colloidal mill, for example a Staro colloidal mill. The homogeneous suspension is then dried by spraying as before, and calcined between 500° C. and 1200° C. for at least 3 hours: a silica-alumina catalyst which may be used in the process of the invention is obtained.

A further method of the invention consists of preparing a solution of decationized orthosilicic acid, as before, then simultaneously or consecutively adding it to an alumina compound, for example an aluminium hydrate in powdered form or in acidulated suspension. To increase the pore diameter of the final silica-alumina, at least one basic compound may optionally be added to the reaction medium. After deep homogenization of the suspension by agitation, optional adjustment of the dry matter content by filtering and optional re-homogenization, the product is dried with simultaneous or consecutive shaping, then calcined as above.

A further method which also forms part of the invention consists of preparing an aqueous suspension or dispersion of alumina, for example an aluminium monohydrate, then simultaneous or consecutively adding it to a silica compound, for example a sodium silicate. To increase the pore diameter of the final silica-alumina, at least one basic compound may optionally be added to the reaction medium. The catalyst is obtained by filtering and washing, optional washing with an ammoniacal solution to extract the residual sodium by ion exchange, and drying with simultaneous or consecutive shaping. After drying with shaping then calcining as before, a catalyst with the characteristics of the invention is obtained. The size of the alumina particles is preferably in the range 1 to 100 microns to obtain good homogenization of the silica-alumina catalyst of the invention.

To increase the diameter of the mesopores of the silica-alumina catalyst, it may be particularly advantageous, as disclosed in U.S. Pat. No. 4,066,574, to prepare an aqueous suspension or dispersion of alumina, for example an aluminium monohydrate, then to neutralize it with a basic solution, for example ammonia, then to simultaneously or consecutively add it to a silica compound, for example a decationized orthosilicic acid solution. After deep homogenization of the suspension by agitation, optional adjustment of the dry matter content by filtering and optional re-homogenization, the product is dried with simultaneous or consecutive shaping, then calcined as above. This method also constitutes a method of the invention.

In the description below of the methods above, the term "homogenization" is used to describe taking a product containing a solid fraction up into solution, for example a suspension, a powder, a filtered precipitate, then dispersing it with intense agitation. Homogenization of a dispersion is a process which is well known to the skilled person. Said homogenization may be carried out using any process which is known to the skilled person, for example in a batch reactor, a continuous mixer or a mill. Said mixing may be carried out in a plug reactor, in particular in a static reactor. "Lightnin" reactors may be cited. An Ultraturrax® turbine or a Staro® turbine may be used, or a colloidal mill, for example a Staro colloidal mill. Commercially available IKA® colloidal mills may also be used.

In the set of methods cited above, it may optionally be desirable to add, during any step of the preparation, a small proportion of at least one stabilizing element selected from the group formed by zirconium and titanium. The stabilizing element is preferably added in the form of a soluble salt.

The acidity of the matrix of the invention may advantageously, but not in a manner which restricts the scope of the invention, be measured by IR monitoring of the thermodesorption of pyridine. In general, the B/L ratio of the matrix of the invention is in the range 0.05 to 1, preferably in the range 0.05 to 0.7, more preferably in the range 0.06 to 0.3 and still more preferably in the range 0.075 to 0.15.

Zeolite

In general, zeolites are beneficial in improving the performance of a catalyst as regards conversion. Any zeolite known for its performance as regards hydrocracking and/or hydroconversion may be used in the supports and catalysts of the invention.

In accordance with one implementation of the invention, but without in any way restricting the scope of the invention, Y zeolites are used with a faujasite structure ("Zeolite Molecular Sieves, Structure, Chemistry and Uses", D W Breck, J WILEY & Sons, 1973) which may be in the hydrogen form or partially exchanged with metal cations, for example using cations of alkaline-earth metals and/or rare earth metals with atomic number 57 to 71 inclusive. Y zeolites which have undergone a second treatment also fall within the scope of the invention. The term "secondary treatment" means the treatments described in "Hydrocracking, Science and Technology" by J Scherzer, A J Gruia, 1996 or in R J Beyerlein. As an example, Y zeolites are prepared using general dealumination techniques.

The Y zeolites generally used in hydrocracking catalysts are manufactured by modifying commercially available Na—Y zeolite. This modification can produce zeolites which are termed stabilized, ultra-stabilized (USY), very ultrastabilized (VUSY) or dealuminated (SDUSY; superdealuminated USY). This designation is often used in the literature, but it does not in any way restrict the characteristics of the zeolites of the present invention to such a designation. This modification is made by a combination of three types of operations which are known in the art: hydrothermal treatment, ion exchange and acid attack. Hydrothermal treatment is completely defined by the conjunction of operating variables, namely temperature, duration, total pressure and partial pressure of water vapour. This treatment can extract aluminium atoms from the silica-alumina framework of the zeolite. The consequence of said treatment is an increase in the framework $SiO_2/Al_2O_3$ molar ratio and a reduction in the crystalline lattice parameter.

Ion exchange is generally carried out by immersing the zeolite in an aqueous solution containing ions which may become bound to cationic exchange sites of the zeolite. This removes the sodium cations present in the zeolite after crystallization.

Acid attack consists of bringing the zeolite into contact with an aqueous solution of a mineral acid. The severity of the acid attack is adjusted by the concentration of acid, the duration and the temperature. Carried out on a hydrothermally treated zeolite, this treatment eliminates the alumina species extracted from the framework and which block the micropores of the solid.

Further, a particular hydrothermal treatment such as that described in U.S. Pat. No. 5,601,798 has the effect of increasing the mesoporosity of Y, USY, VUSY and SDUSY zeolites, which zeolites are particularly advantageous in combination with the amorphous matrix described above.

Various Y zeolites may advantageously be used.

The H—Y acid zeolite of the invention is characterized by different specifications: a lattice parameter a of the unit cell in the range $24.40 \times 10{-10}$ m to $24.15 \times 10{-10}$ m and preferably in the range $24.38 \times 10^{-10}$ to $24.24 \times 10^{-10}$ m; an overall $SiO_2/Al_2O_3$ molar ratio in the range from about 10 to 70 and preferably in the range about 12 to 50: a sodium content of less than 0.15% by weight, determined on the zeolite calcined at 1100° C.; a sodium ion take-up capacity CNa, expressed in grams of Na per 100 grams of modified zeolite, neutralized then calcined, of more than about 0.85; a specific surface area, determined by the BET method, of more than about 400 m$^2$/g and preferably more than 550 m$^2$/g; a water vapour adsorption capacity at 25° C. for a partial pressure of 2.6 torrs (i.e. 34.6 MPa) of more than about 6%; and advantageously, the zeolite has a pore distribution, determined by nitrogen physisorption, in the range about 5% to 45% and preferably in the range 5% to 40% of the total pore volume of the zeolite contained in pores with a diameter in the range $20 \times 10^{-10}$ m to $80 \times 10^{-10}$ m and in the range 5% to 45% and preferably in the range 5% to 40% of the total pore volume of the zeolite contained in pores with a diameter of more than $80 \times 10^{-10}$ m and generally less than $1000 \times 10^{-10}$ m, the remainder of the pore volume being contained in pores with a diameter of less than $20 \times 10^{-10}$ m.

A preferred catalyst using this type of zeolite comprises a silico-alumina matrix, at least one dealuminated Y zeolite having a lattice parameter which is in the range 2.415 nm to 2.440 nm, preferably in the range 2.424 to 2.438 nm, an overall $SiO_2/Al_2O_3$ molar ratio of more than 10, a content of alkaline-earth metal or alkali metal cations and/or rare earth cations such that the atomic ratio $(n \times M^{n+})/Al$ is less than 0.8, preferably less than 0.5 or 0.1, a specific surface area determined by the BET method of more than 400 m$^2$/g, preferably more than 550 m$^2$/g, and a water adsorption capacity at 25° C. for a value $P/P_0$ of 0.2, of more than 6% by weight, said catalyst also comprising at least one hydrodehydrogenating metal, and silicon deposited on the catalyst.

In an advantageous implementation of the invention, a partially amorphous Y zeolite is used.

The term "partially amorphous Y zeolite" means a solid having:
 i) a peak ratio which is less than 0.40, preferably less than about 0.30;
 ii) a crystalline fraction, expressed with respect to a reference Y zeolite in the sodium form (Na), which is less than about 60%, preferably less than about 50%, and determined by X ray diffraction.

Preferably, the solid partially amorphous Y zeolites forming part of the composition of the catalyst of the invention have at least one (preferably all) of the following further characteristics:
 iii) an overall Si/Al ratio of more than 15, preferably more than 20 and less than 150;
 iv) a framework Si/Al$^{IV}$ ratio which is greater than or equal to the overall Si/Al ratio;

v) a pore volume which is at least 0.20 ml/g of solid a fraction of which, in the range 8% to 50%, is constituted by pores with a diameter of at least 5 nm (nanometers), namely 50 Å;

vi) a specific surface area of 210-800 m$^2$/g, preferably 250-750 m$^2$/g and advantageously 300-600 m$^2$/g.

The peak ratio of a conventional USY zeolite is 0.45 to 0.55; its crystalline fraction with respect to a completely crystalline NaY is 80% to 95%. The peak ratio of the solid forming the subject matter of the present description is less than 0.4 and preferably less than 0.35. Its crystalline fraction is thus less than 70%, preferably less than 60%.

The partially amorphous zeolites are prepared using techniques which are generally used for dealumination, from commercially available Y zeolites, i.e. which generally have a high degree of crystallinity (at least 80%). More generally, it is possible to start from zeolites having a crystalline fraction of at least 60%, or at least 70%.

The Y zeolites generally used in hydrocracking catalysts are manufactured by modifying commercially available Na—Y zeolites. This modification can produce zeolites termed stabilized, ultra-stabilized or dealuminated zeolites. This modification is carried out by one or more dealumination techniques, for example hydrothermal treatment, acid attack. Preferably, said modification is carried out by combining three types of operations which are known to the skilled person: hydrothermal treatment, ion exchange and acid attack.

A further particularly advantageous zeolite is a zeolite which is not dealuminated overall and is highly acidic.

The term "not dealuminated overall" means a Y zeolite (structure type FAU, faujasite) using the nomenclature developed in the "Atlas of Zeolite Structure Types" by W M Meier, D H Olson and Ch Baerlocher, 4$^{th}$ revised edition, 1996, Elsevier. The lattice parameter of said zeolite may be reduced by extracting aluminium from the structure or framework during preparation but the overall SiO$_2$/Al$_2$O$_3$ ratio has not changed as the aluminium has not been chemically extracted. Said overall non dealuminated zeolite thus has a composition of silicon and aluminium, expressed by the overall SiO$_2$/Al$_2$O$_3$ ratio, equivalent to the starting non dealuminated Y zeolite. Values for the parameters (SiO$_2$/Al$_2$O$_3$ ratio and lattice parameter) are given below. Said non dealuminated Y zeolite may either be in the hydrogen form, or at least partially exchanged with metal cations, for example using alkaline-earth metal cations and/or rare earth metal cations with atomic numbers 57 to 71 inclusive. Preferably, a zeolite depleted in rare earths and alkaline-earths is used, and similarly for the catalyst.

The Y zeolite which is not generally dealuminated overall has a lattice parameter which is more than 2.438 nm, an overall SiO$_2$/Al$_2$O$_3$ ratio of less than 8, a framework SiO$_2$/Al$_2$O$_3$ ratio of less than 21 and more than the overall SiO$_2$/Al$_2$O$_3$ ratio. An advantageous catalyst combines said zeolite with a matrix doped with phosphorus.

The zeolite which is not dealuminated overall may be obtained by any treatment which does not extract aluminium from the sample, such as steaming, or treatment with SiCl$_4$.

In a further preferred implementation of the invention, the support comprises a zeolite as described in U.S. Pat. No. 5,601,978. Said zeolites are described in column 30, lines 48-64. in particular, their mesoporous volume is more than 0.313 cm$^3$/g for a lattice parameter in the range 24.3 Å to 24.4 Å.

The preparation and the treatment or treatments and shaping of the zeolite may thus constitute a step in the preparation of said catalysts.

The zeolite may be introduced using any known technique known to the skilled person during the preparation of the matrix or during shaping of the support.

Preparation of Catalyst

The catalysts of the invention may be prepared using any method known to the skilled person.

A preferred process for preparing a catalyst of the present invention comprises the following steps:

The zeolite may be introduced using any method known to the skilled person and at any stage in the preparation of the support or catalyst.

In a preferred preparation method, the zeolite may be introduced during synthesis of the precursors of the matrix. A non-limiting example of the form of the zeolite is as a powder, ground powder, suspension, suspension which has undergone a deagglomeration treatment. Thus, for example, the zeolite may be taken up in suspension which may or may not be acidulated in a concentration adjusted to the intended final amount of zeolite on the support. Said suspension, known as a slurry, is then mixed with the precursors of the matrix at any stage of its synthesis, as described above.

In accordance with another preferred preparation mode, the zeolite may also be introduced during shaping of the support with elements which constitute the matrix, possibly with at least one binder. The zeolite may, in a non limiting manner, be in the form of a powder, ground powder, suspension or suspension which has undergone a deagglomeration treatment.

The group VIB and/or VIII elements, and optionally those selected from phosphorus, boron, silicon and optionally elements from groups VB and VIIB, may then optionally be introduced at this stage of the catalyst preparation using any method known to the skilled person. They may also be introduced after shaping the support, before or after drying and calcining the support.

The hydrogenating element may be introduced at any stage of the preparation, preferably during mixing, or more preferably after shaping. Shaping is followed by calcining; the hydrogenating element may also be introduced before or after calcining. The preparation is generally completed by calcining at a temperature of 250° C. to 600° C. A further preferred method of the present invention consists of shaping the alumina-silica without a binder after mixing the latter, then passing the paste obtained through a die to form extrudates with a diameter in the range 0.4 to 4 mm. The hydrogenating function may then be introduced in part alone (in the case, for example, of combinations of oxides of group VIB and VIII metals) or completely, at the moment of mixing. It may also be introduced by one or more ion exchange operations into the calcined support constituted by at least one alumina-silica, optionally shaped with a binder, using solutions containing precursor salts of the selected metals when these belong to group VIII. It may also be introduced by one or more operations for impregnation of the shaped and calcined support, using a solution of precursors of oxides of metals from groups VIII (in particular cobalt and nickel) when the precursors of the oxides of metals from group VIB (in particular molybdenum or tungsten) have already been introduced on mixing the support. Finally, it may also be introduced, highly preferably by one or more operations for impregnating the calcined support constituted by at least one alumina-silica of the invention and optionally at least one binder, using solutions containing precursors of oxides of metals from groups VI and/or VIII, precursors of oxides of metals from group VIII preferably being introduced after those from group VIB or at the same time thereas.

Preferably, the support is impregnated using an aqueous solution. Impregnation of the support is preferably carried out using the "dry" impregnation method which is well known to the skilled person. Impregnation may be carried out in a single step using a solution containing all of the constituent elements of the final catalyst.

The catalyst of the present invention may thus comprise at least one element from group VIII such as iron, cobalt, nickel, ruthenium, rhodium, palladium, osmium, iridium or platinum. Preferred examples of group VIII metals are metals selected from the group formed by iron, cobalt, nickel, platinum, palladium and ruthenium. The catalyst of the invention may also comprise at least one element from group VIB, preferably tungsten or molybdenum. Advantageously, the following combinations of metals are used: nickel-molybdenum, cobalt-molybdenum, iron-molybdenum, iron-tungsten, nickel-tungsten, cobalt-tungsten, platinum-palladium; preferred combinations are: nickel-molybdenum, cobalt-molybdenum, cobalt-tungsten and more advantageously platinum-palladium and nickel-tungsten. It is also possible to use combinations of three metals, for example nickel-cobalt-molybdenum, nickel-molybdenum-tungsten, nickel-cobalt-tungsten. Advantageously, the following combinations are used: nickel-niobium-molybdenum, cobalt-niobium-molybdenum, iron-niobium-molybdenum, nickel-niobium-tungsten, cobalt-niobium-tungsten, iron-niobium-tungsten; preferred combinations are: nickel-niobium-molybdenum, cobalt-niobium-molybdenum. It is also possible to use combinations of four metals, for example nickel-cobalt-niobium-molybdenum. It is also possible to use combinations containing a noble metal such as ruthenium-niobium-molybdenum or ruthenium-nickel-niobium-molybdenum.

At least one of the following elements: phosphorus and/or boron and/or silicon and possibly element(s) selected from groups VIIB and VB are introduced into the catalyst at any stage of the preparation and using any technique which is known to the skilled person.

A preferred method of the invention consists of depositing the selected doping element or elements, for example boron and silicone, onto the precursor, which may or may not have been calcined, preferably calcined. To this end, an aqueous solution of at least one boron salt such as ammonium biborate or ammonium pentaborate is prepared in an alkaline medium and in the presence of hydrogen peroxide and dry impregnation is then carried out in which the pore volume of the precursor is filled with the solution containing boron, for example. In the case in which silicon is also deposited, for example, a solution of a silicone type silicon compound or a silicon oil emulsion is used.

Boron and silicon may also be deposited simultaneously using, for example, a solution containing a boron salt and a silicone type silicon compound. Thus, for example in the case in which the precursor is a nickel-tungsten type catalyst supported on alumina-silica, it is possible to impregnate this precursor using an aqueous solution of ammonium biborate and Rhodorsil EIP silicone from Rhodia, to dry, for example at 120° C., then to impregnate with a solution of ammonium fluoride, to dry at 120° C. for example, and then to calcine, for example and preferably in air in a traversed bed, for example at 500° C. for 4 hours.

The doping element selected from the group formed by phosphorus, silicon and boron and the group VIIB and VB elements may be introduced using one or more impregnation operations using an excess of solution on the calcined precursor.

When at least one doping element, P and/or B and/or Si, is introduced, its distribution and location may be determined by techniques such as a Castaing microprobe (distribution profile of the various elements), a transmission electron microscope coupled to X ray analysis of the catalyst components, or by establishing a distribution map of the elements present in the catalyst by electron microprobe. These techniques can show the presence of these exogenous elements added after synthesis of the alumina-silica of the invention.

It may be advantageous to prepare catalysts having homogeneous concentrations $C_{Mo}$, $C_{Ni}$, $C_W$ and $C_P$ along the extrudate. It is also advantageous to prepare catalysts having different core and peripheral $C_{Mo}$, $C_{Ni}$, $C_W$ and $C_P$ concentrations. These catalysts have "dished" or "domed" distribution profiles. A further distribution type is the crust type where the elements of the active phase are distributed on the surface.

In general, the core/periphery ratio of the concentrations $C_{Mo}$, $C_{Ni}$, $C_W$ and $C_P$ is in the range 0.1 to 3. In a variation of the invention, it is in the range 0.8 to 1.2. In a further variation of the invention, the core/periphery ratio for concentrations $C_P$ is in the range 0.3 to 0.8.

The preferred phosphorus source is orthophosphoric acid $H_3PO_4$, but salts and esters such as ammonium phosphates are also suitable. Phosphorus may, for example, be introduced in the form of a mixture of phosphoric acid and a basic organic compound containing nitrogen, such as ammonia, primary and secondary amines, cyclic amines, compounds from the pyridine family and quinolines and compounds from the pyrrole family. Tungsto-phosphoric or tungsto-molybdic acids may be used.

The amount of phosphorus is adapted, without limiting the scope of the invention, to form a mixed compound in solution and/or on the support, for example tungsten-phosphorus or molybdenum-tungsten-phosphorus. Said mixed compounds may be heteropolyanions. These compounds may be Anderson heteropolyanions, for example. The phosphorus content, expressed in its $P_2O_5$ form, is in the range 0.01% to 5% by weight, preferably in the range 0.1% to 4% by weight, more preferably in the range 0.2% to 2%, and still more preferably in the range 0.2% to 1%.

The boron source may be boric acid, preferably orthoboric acid $H_3BO_3$, ammonium biborate or pentaborate, boron oxide, boric esters. The boron may, for example, be introduced in the form of a mixture of boric acid, hydrogen peroxide and a basic organic compound containing nitrogen such as ammonia, primary and secondary amines, cyclic amines compounds from the pyridine family and quinolines and compounds from the pyrrole family. The boron may, for example, be introduced using a solution of boric acid in a water/alcohol mixture.

Many sources of silicon may be used. It is possible to use ethyl orthosilicate $Si(OEt)_4$, siloxanes, polysiloxanes, silicones, silicone emulsions, halogenated silicates such as ammonium fluorosilicate $(NH_4)_2SiF_6$ or sodium fluorosilicate $Na_2SiF_6$. Silicomolybdic acid and its salts, silicotungstic acid and its salts may also advantageously be used. The silicon may, for example, be added by impregnating ethyl silicate in solution in a water/alcohol mixture. The silicon may, for example, be added by impregnating a silicone type silicon compound or silicic acid suspended in water.

The group VIB or group VIII metals of the catalyst of the present invention may be present completely or partially in the form of a metal and/or oxide and/or sulphide.

Examples of sources of molybdenum and tungsten which may be used are oxides and hydroxides, molybdic and tungstic acids and their salts, in particular ammonium salts such as ammonium molybdate, ammonium heptamolybdate, ammonium tungstate, phosphomolybdic acid, phosphotungstic acid and their salts, silicomolybdic acid, silicotungstic acid and their salts.

Sources of group VIII elements which may be used are well known to the skilled person. Examples of non noble metals are nitrates, sulphates, hydroxides, phosphates, halides, for example chlorides, bromides or fluorides and carboxylates, for example acetates and carbonates. For noble metals, halides may be used, for example chlorides, nitrates, acids such as chloroplatinic acid or oxychlorides such as ammoniacal ruthenium oxychloride.

Preferably, no other halogens apart from those introduced on impregnation are added, the halogen preferably being chlorine.

Throughout the methods cited above, it may be desirable to add, at any stage of the preparation, a minor proportion of at least one stabilizing element selected from the group formed by zirconium and titanium.

Catalyst and Support Shaping

The support may be shaped using any technique which is known to the skilled person. Shaping may, for example, be carried out by extrusion, pelletization, by the oil drop coagulation method, by rotating plate granulation or by any other method which is known to the skilled person.

Shaping may also be carried out in the presence of various constituents of the catalyst and extrusion of the mineral paste obtained, by pelletization, by shaping into beads on a rotating bowl granulator or drum, by oil drop coagulation, oil-up coagulation or by any other known method for agglomerating a powder containing alumina and optionally other ingredients selected from those mentioned above.

The constituent elements of the matrix of the support may also be introduced partially or completely in the form of a powder.

The catalysts used in the present invention have the shape of spheres or extrudates. However, it is advantageous for the catalyst to be in the form of extrudates with a diameter in the range 0.5 to 5 mm, more particularly in the range 0.7 to 2.5 mm. The shapes are cylindrical (which may or may not be hollow), twisted cylinders, multilobes (2, 3, 4 or 5 lobes, for example), or rings. The cylindrical shape is preferably used, but any other form may be used.

Further, said supports used in the present invention may have been treated, as is well known to the skilled person, by additives to facilitate shaping and/or to improve the final mechanical properties of the silica-alumina catalysts. Examples of additives which may be cited are cellulose, carboxymethyl cellulose, carboxyethyl cellulose, tall oil, xanthan gums, surfactants, flocculating agents such as polyacrylamides, carbon black, starches, stearic acid, polyacrylic alcohol, polyvinyl alcohol, biopolymers, glucose, polyethylene glycols, etc.

Partial adjustment of the characteristic porosity of the supports of the invention is carried out during this step for shaping the support particles.

Shaping may be carried out using catalyst shaping techniques which are known in the art, such as extrusion, pelletization, spray drying or drageification.

Water may be added or removed to adapt the viscosity of the paste to be extruded. This step may be carried out at any stage of the mixing step. In the case of alumino-silicate supports, it may be advantageous to reduce the quantity of water in the paste to increase the mechanical strength of the paste. This generally results in a reduction in the total volume for an optimum acid content.

To adapt the solid material content of the paste to be extruded to render it extrudable, it is also possible to add a mainly solid compound, preferably an oxide or hydrate. Preferably, a hydrate is used, more preferably an aluminium hydrate. The loss on ignition of the hydrate is more than 15%.

The amount of acid added on mixing before shaping is less than 30%, preferably in the range 0.5% to 20% by weight of the anhydrous mass of silica and alumina engaged in the synthesis.

Extrusion may be carried out using any conventional tool which is on the market. The paste issuing from the mixing step is extruded through a die, for example using a piston or a single or twin extrusion screw. This extrusion step may be carried out using any method which is known to the skilled person.

The support extrudates of the invention generally have a crush strength of at least 70 N/cm, more preferably 100 N/cm or more.

Calcining the Support

Drying is carried out using any technique which is known to the skilled person.

To obtain the support of the present invention, it is preferable to calcine in the presence of molecular oxygen, for example by flushing with air, at a temperature of 1100° C. or less. At least one calcining step may be carried out after any one of the preparation steps. This treatment may, for example, be carried out in a traversed bed, swept bed or in a static atmosphere. As an example, the furnace used may be a rotary furnace or a vertical furnace with radial flow layers. The calcining conditions—temperature and duration—principally depend on the maximum catalyst service temperature. The preferred calcining conditions are between more than one hour at 200° C. and less than one hour at 1100° C. Calcining may be carried out in the presence of steam. Final calcining may optionally be carried out in the presence of an acidic or basic vapour. As an example, calcining may be carried out in a partial pressure of ammonia.

Post-Synthesis Treatments

Post-synthesis treatments may be carried out to improve the properties of the support, in particular its homogeneity as defined above.

In one preferred implementation, the post-synthesis treatment is a hydrothermal treatment. The hydrothermal treatment is carried out using any technique which is known to the skilled person. The term "hydrothermal treatment" means contact at any stage of the manufacture of the mixed support with water in the vapour phase or in the liquid phase. The term "hydrothermal treatment" encompasses maturation, steaming, autoclaving, calcining in moist air, and rehydration. Without restricting the scope of the invention, such a treatment may have the effect of rendering the silica component mobile.

According to the invention, maturation may take place before or after shaping. In a preferred mode of the invention, hydrothermal treatment is carried out by steaming in a furnace in the presence of water vapour. The temperature during steaming may be in the range 600° C. to 1100° C., preferably over 700° C. for a period in the range 30 minutes to 3 hours. The steam content is more than 20 g of water per kg of dry air and preferably more than 40 g of water per kg of dry air, more preferably more than 100 g of water per kg of dry air. Such a treatment may, if required, completely or partially replace the calcining treatment.

The support may then optionally undergo hydrothermal treatment in a confined atmosphere. The term "hydrothermal treatment in a confined atmosphere" means treatment using an autoclave in the presence of water at a temperature which is above ambient temperature.

During said hydrothermal treatment, the shaped alumina-silica or the support (matrix+zeolite) may be treated in different manners. Thus, the support or alumina-silica may be impregnated with acid prior to its entry into the autoclave, alumina-silica autoclaving being carried out either in the vapour phase or in the liquid phase; said vapour or liquid phase in the autoclave may or may not be acidic. Impregnation prior to autoclaving may or may not be acidic. Said impregnation prior to autoclaving may be carried out dry or by immersing the silica-alumina or support in an aqueous acidic solution. The term "dry impregnation" means bringing the alumina into contact with a volume of solution which is less than or equal to the total pore volume of the treated alumina. Preferably, dry impregnation is carried out.

The autoclave is preferably a rotating basket autoclave such as that defined in EP-A-0 387 109.

The temperature during autoclaving may be in the range 100° C. to 250° C. for a period in the range 30 minutes to 3 hours.

Processes for Processing Hydrocarbon Feeds in Accordance with the Invention

In general, the catalysts of the invention are used for the treatment of hydrocarbon cuts, generally in the presence of hydrogen, at a temperature of 200° C. or more, at a pressure of more than 1 MPa, the space velocity being in the range 0.1 to 20 $h^{-1}$ and the quantity of hydrogen introduced being such that the volume ratio of litres of hydrogen/litres of hydrocarbon is in the range 80 to 5000 l/l.

The catalysts of the invention are advantageously used for hydrocracking/hydroconversion of hydrocarbon cuts.

The catalysts of the invention may also be used for hydrotreatment of hydrocarbon feeds, used alone or upstream of a hydrocracking/hydroconversion process on a hydrocracking catalyst based on zeolite or alumina-silica, preferably comprising nickel and tungsten.

Catalyst Sulphurization

Prior to injecting the feed, the catalysts used in the process of the present invention preferably undergo a sulphurization treatment to at least partially transform the metallic species into sulphide prior to contact with the feed to be treated. This sulphurization activation treatment is well known to the skilled person and may be carried out using any method which has already been described in the literature, either in situ, i.e. in the reactor, or ex situ.

A conventional sulphurization method which is well known to the skilled person consists of heating in the presence of hydrogen sulphide (pure or, for example, in a stream of a hydrogen/hydrogen sulphide mixture) at a temperature in the range 150° C. to 800° C., preferably in the range 250° C. to 600° C., generally in a traversed bed reaction zone.

Feeds

Very different feeds may be treated by the processes of the invention described above and generally they contain at least 20% by volume and usually at least 80% by volume of compounds boiling above 340° C.

The feed may, for example, be LCO (light cycle oil; light gas oil from a catalytic cracking unit), atmospheric distillates, vacuum distillates, for example gas oils from straight run distillation or conversion units such as FCC, a coker or from visbreaking, and feeds from units for extraction of aromatics from lubricating oil bases or from solvent dewaxing of lubricating oil bases, or from distillates from desulphurization processes or fixed bed hydroconversion or ebullated bed atmospheric residue (AR) hydroconversion and/or RSV (vacuum residues) and/or deasphalted oils, or the feed may be a deasphalted oil, or any mixture of the feeds cited above. The above list is not limiting. Paraffins from the Fischer-Tropsch process are excluded. In general, the feeds have a boiling point T5 of more than 340° C., preferably more than 370° C., i.e. 95% of the compounds present in the feed have a boiling point of more than 340° C., and preferably more than 370° C.

The nitrogen content of the feeds treated in the processes of the invention is usually more than 500 ppm, preferably in the range 500 to 10000 ppm by weight, more preferably in the range 700 to 4000 ppm by weight and still more preferably in the range 1000 to 4000 ppm. The sulphur content of the feeds treated in the processes of the invention is usually in the range 0.01% to 5% by weight, preferably in the range 0.2% to 4% and more preferably in the range 0.5% to 2%.

The feed may optionally contain metals. The cumulative nickel and vanadium content of the feeds treated in the processes of the invention is preferably less than 1 ppm by weight.

The asphaltenes content is preferably less than 3000 ppm, preferably less than 1000 ppm, more preferably less than 200 ppm.

Guard Beds

In the case in which the feed contains resins and/or asphaltene type compounds, it is advantageous to initially pass the feed over a bed of catalyst or adsorbant which differs from the hydrocracking or hydrotreatment catalyst.

The catalysts or guard beds used in accordance with the invention have the shape of spheres or extrudates. Advantageously, however, the catalyst is in the form of extrudates with a diameter in the range 0.5 to 5 mm and more particularly in the range 0.7 to 2.5 mm. The shapes are cylindrical (hollow or otherwise, twisted cylinders, multilobes (2, 3, 4 or 5 lobes, for example), rings. The cylindrical shape is preferred, but any other form may be used.

To remedy the presence of contaminants and/or poisons in the feed, the guard catalysts may, in a further preferred implementation, have more particular geometric shapes to increase their void fraction. The void fraction of these catalysts is in the range 0.2 to 0.75. Their external diameter may be between 1 and 35 mm. Non-limiting particular possible shapes are: hollow cylinders, hollow rings, Raschig rings, hollow toothed cylinders, hollow crenellated cylinders, penta-ring wheels, multi-holed cylinders, etc.

These catalysts may have been impregnated with an active or inactive phase. Preferably, the catalysts are impregnated with a hydrodehydrogenating phase. More preferably, the CoMo or NiMo phase is used.

These catalysts may have macroporosity. The guard beds may be those sold by Norton-Saint-Gobain, for example MacroTrap® guard beds. The guard beds may be those sold by Axens from the ACT family: ACT077, ACT935, ACT961 or HMC841, HMC845, HMC941 or HMC945.

It may be particularly advantageous to superimpose these catalysts in at least two different beds of varying heights. Catalysts with the highest void fraction are preferably used in the first catalytic bed(s) at the inlet to the catalytic reactor. It may also be advantageous to use at least two different reactors for these catalysts.

Preferred guard beds of the invention are HMC and ACT961.

Operating Conditions

The operating conditions, such as temperature, pressure, hydrogen recycle, hourly space velocity, may vary widely depending on the nature of the feed, the desired quality of the products and the facilities available at the refinery. The hydrocracking/hydroconversion catalyst or hydrotreatment catalyst is generally brought into contact in the presence of hydrogen with the feeds described above, at a temperature of more than 200° C., usually in the range 250° C. to 480° C., advantageously in the range 320° C. to 450° C., preferably in the range 330° C. to 435° C., at a pressure of more than 1 MPa, usually in the range 2 to 25 Pa, preferably in the range 3 to 20 MPa, the space velocity being in the range 0.1 to 20 h$^{-1}$ and preferably 0.1-6 h$^{-1}$, preferably 0.2-3 h$^{-1}$, and the quantity of hydrogen introduced is such that the volume ratio of litres of hydrogen/litres of hydrocarbon is in the range 80 to 5000 l/l and usually in the range 100 to 2000 l/l.

These operating conditions used in the processes of the invention generally produce a conversion per pass into products having boiling points of less than 340° C., preferably less than 370° C., of more than 15%, preferably in the range 20% to 95%.

Implementations

The hydrocracking and/or hydroconversion processes using the catalysts of the invention cover pressure and conversion ranges from mild hydrocracking to high pressure hydrocracking. The term "mild hydrocracking" means hydrocracking resulting in moderate conversions, generally less than 40%, and operating at low pressure, generally in the range 2 MPa to 6 MPa.

The catalyst of the present invention may be used alone in a single or a plurality of fixed catalytic beds, in one or more reactors, in a hydrocarbon layout termed a once-through process, with or without a liquid recycle of the unconverted fraction, optionally in association with a hydrorefining catalyst located upstream of the catalyst of the present invention.

The catalyst of the present invention may be used alone, in one or more ebullated bed reactors, in a once-through hydrocracking process, with or without a liquid recycle of the unconverted fraction, optionally in association with a hydrorefining catalyst located upstream of the catalyst of the present invention.

The ebullated bed operates withdrawal of the used catalyst and daily addition of fresh catalyst to keep the activity of the catalyst stable.

In a two-step hydrocracking process with intermediate separation between the two reaction zones, in a given step, the catalyst of the present invention may be used in one or more reactors, in combination or otherwise with a hydrorefining catalyst located upstream of the catalyst of the present invention.

Once-Through Process

Once-through hydrocracking generally comprises, firstly, deep hydrorefining aimed at deep hydrodenitrogenation and desulphurization of the feed before sending it to the hydrocracking catalyst proper, in particular when the latter comprises a zeolite. This deep hydrorefining of the feed produces only limited conversion of the feed into lighter fractions, which is insufficient and must thus be completed using the more active hydrocracking catalyst. However, it should be noted that no separation is carried out between the two types of catalyst. The whole of the effluent from the reactor is injected onto the hydrocracking catalyst proper and separation of the products formed is only carried out after this. This version of hydrocracking, once-through hydrocracking, has a variation which involves recycling the unconverted fraction to the reactor for deeper conversion of the feed.

Fixed Bed Once-Through Process

For low silica catalysts, the silica content of the support forming part of the composition of the catalyst is in the range 5% to 30%, preferably in the range 5% to 20% by weight.

For high silica catalysts, the silica content of the support forming part of the composition of the catalyst is in the range 20% to 80%, preferably in the range 30% to 60%.

When the catalyst of the present invention is used upstream of a zeolitic hydrocracking catalyst, for example based on Y zeolite, a catalyst with a low silica content as defined above is advantageously used. It may advantageously be used in association with a hydrorefining catalyst, this latter being located upstream of the catalyst of the present invention.

When the catalyst of the present invention is used upstream of a hydrocracking catalyst based on alumina-silica or zeolite, in the same reactor in distinct catalytic beds or in distinct reactors, conversion is generally (or preferably) less than 50% by weight and preferably less than 40%.

The catalyst of the invention may be used upstream or downstream of the zeolitic catalyst. Downstream of the zeolitic catalyst, it can crack HPAs. The term "HPA" means polyaromatic hydrocarbons as described in particular in the work "Hydrocracking, Science and Technology" by J Scherzer, M Dekker Incorporated, 1996.

Ebullated Bed Once-Through Process

The catalyst of the invention may be used alone in one or more reactors.

In the context of such a process, several reactors in series may advantageously be used, the ebullated bed reactor or reactors containing the catalyst of the invention being preceded by one or more reactors containing at least one hydrorefining catalyst in a fixed or ebullated bed.

When the catalyst of the present invention is used downstream of a hydrorefining catalyst, conversion of the fraction of the feed occasioned by said hydrorefining catalyst is generally (or preferably) less than 30% by weight and preferably less than 25%.

Fixed Bed Once-Through Process with Intermediate Separation

The catalyst of the present invention may also be used in a once-through hydrocracking process comprising a hydrorefining zone, a zone allowing partial elimination of ammonia, for example by a hot flash, and a zone comprising a hydrocracking catalyst. This process for hydrocracking hydrocarbon feeds in one step for the production of middle distillates and possibly oil bases comprises at least one first reaction zone including hydrorefining, and at least one second reaction zone, in which hydrocracking of at least a portion of the effluent from the first reaction zone is carried out. This process also comprises incomplete separation of ammonia from the effluent leaving the first zone. This separation is advantageously carried out using an intermediate hot flash. Hydrocracking in the second reaction zone is carried out in the presence of ammonia in a quantity which is lower than the quantity present in the feed, preferably less than 1500 ppm by weight, more preferably less than 1000 ppm by weight and still more preferably less than 800 ppm by weight of nitrogen.

The catalyst of the present invention is preferably used in the hydrocracking reaction zone in combination or not in combination with a hydrorefining catalyst located upstream of the catalyst of the present invention. The catalyst of the invention may be used upstream or downstream of a zeolitic catalyst. Downstream of the zeolitic catalyst, HPAs or HPA precursors may be converted.

The catalyst of the present invention may be used in the first reaction zone for converting pretreatment, alone or in association with a conventional hydrorefining catalyst, located upstream of the catalyst of the invention, in one or more catalytic beds, in one or more reactors.

Once-Through Hydrocracking Process with Preliminary Hydrorefining on Low Acidity Catalyst The catalyst of the invention may be used in a hydrocracking process comprising:

a first hydrorefining reaction zone in which the feed is brought into contact with at least one hydrorefining catalyst having, in a standard activity test, a degree of cyclohexane conversion of less than 10% by weight;

a second hydrocracking reaction zone in which at least a portion of the effluent from the hydrorefining step is brought into contact with at least one zeolitic hydrocracking catalyst having, in the standard activity test, a degree of cyclohexane conversion of more than 10% by weight, the catalyst of the invention being present in at least one of two reaction zones.

The proportion of the catalytic volume of the hydrorefining catalyst generally represents 20% to 45% of the total catalytic volume.

The effluent from the second reaction zone is at least partially, preferably entirely introduced into the second reaction zone of said process. Intermediate gas separation may be carried out as described above.

The effluent from the second reaction zone undergoes final separation (for example by atmospheric distillation, optionally followed by vacuum distillation), to separate the gases. At least one residual liquid fraction is obtained, essentially containing products with a boiling point of generally more than 340° C., which may be recycled at least in part upstream of the second reaction zone of the process of the invention, and preferably upstream of the hydrocracking catalyst based on alumina-silica, with the aim of producing middle distillates.

The conversion of products having boiling points of less than 340° C. or less than 370° C. is at least 50% by weight.

Two-Step Process

Two-step hydrocracking comprises a first step aimed, as in the once-through process, at hydrorefining the feed, but also at producing a conversion thereof which is generally of the order of 40% to 60%. The effluent from the first step then undergoes separation (distillation) which is usually termed intermediate separation, which is aimed at separating the conversion products from the unconverted fraction. In the second step of a two-step hydrocracking process, only the fraction of feed that is not converted in the first step is treated. This separation allows a two-step hydrocracking process to be more selective in middle distillate (kerosene+diesel) than a once-through process. In fact, intermediate separation of the conversion products avoids "overcracking" them into naphtha and gas in the second step on the hydrocracking catalyst. Further, it should be noted that the unconverted fraction of the feed treated in the second step generally contains very small amount of $NH_3$ as well as organic nitrogen-containing compounds, in general less than 20 ppm by weight or even less than 10 ppm by weight.

The same configuration of fixed bed or ebullated bed catalytic beds may be used in the first step of a two-step process as when the catalyst is used alone or in association with a conventional hydrorefining catalyst. The catalyst of the invention may be used upstream or downstream of a zeolitic catalyst. Downstream of the zeolitic catalyst, it can convert HPAs or HPA precursors.

For once-through processes and for the first step of two-step hydrocracking processes, preferred catalysts of the invention are doped catalysts based on non noble group VIII elements, more preferably catalysts based on nickel and tungsten, the preferred doping element being phosphorus.

The catalysts used in the second step of the two-step hydrocracking process are preferably doped catalysts based on elements from group VIII, more preferably catalysts based on platinum and/or palladium, the preferred doping element being phosphorus.

The following examples illustrate the present invention without in any way limiting its scope.

EXAMPLES

Example 1

Preparation of Catalyst C1, in Accordance with the Invention

Synthesis of a Silica-Alumina Matrix AS1

The SA1 matrix is obtained by the following way.

An alumina hydrate is prepared according to the U.S. Pat. No. 3,124,418. After filtration, the precipitate is mixed with an silicic acid solution prepared by exchange on an ion exchange resin. The proportions of the two solutions are added in order to reach a final composition of the silica-alumina matrix in anhydrous product of 70% $Al_2O_3$-30% $SiO_2$. This mixture is homogenized in a commercial colloid mill in presence of nitric acid so that the content of nitric acid of the suspension when coming out from the mill is 8% with respect to the alumina-silica mixed solid. Then, the suspension is dry classically in a conventional atomizer on a temperature range of 300° C. to 60° C.

Zeolite Z1

We use a USY type zeolite Z1 with a ratio Si/Al measured by FX of 14.7, with a frame ratio Si/Al measured by RMN of 19, with a content of sodium of 260 ppm, with a mesh parameter a=24.29 A, with a crystallinity rate of 88% and with a BET surface of 838 m2/g.

Support Shaping 5 g of zeolite and 95 g of the alumina-silica matrix AS1 are mixed with respect to the solid material as described above. This mixture is realized before the introduction in the extruder. The zeolite powder is first wet then added to the alumina-silica matrix powder in presence of nitric acid 66% (5% by weight of acid per gram of dry gel). The obtained mixture is mixed during 15 minutes. The slurry obtained is passed through a die provided with cylindrical apertures with diameter equal to 1.4 mm. The extrudates are then dried overnight at 120° C. under air and then calcined at 550° C. under air, and then calcined at 700° C. in presence of water vapor.

The support S1, containing 5% of zeolite Z1 is then obtained with respect to the anhydrous mass. The mass composition of the support S1 in anhydrous product is 66.5% $Al_2O_3$ and 33.5% $SiO_2$.

Preparation of the Hydrocracking Catalyst in Accordance with the Invention C1

The catalyst C1 is obtained by dry impregnation of the support S1 in the form of extrudate using a solution containing tungsten and nickel salts and phosphoric acid $H_3PO_4$. The tungsten salt is ammonium metatungstate $(NH_4)_6H_2W_{12}O_{40}*4H_2O$ and the nickel salt was nickel nitrate $Ni(NO_3)_2*6H_2O$. After maturation at ambient temperature in a water-saturated atmosphere, the impregnated extrudates were dried at 120° C. overnight then calcined at 500° C. in dry air. The final $WO_3$, $NiO$, $P_2O_5$ of the catalyst C1 are 24.7%, 3.6% and 2% by weight.

The characteristics of the catalyst C1 are the following ones:
The BET specific surface area is 245 m2/g,
The total pore volume, measured by nitrogen porosimetry, is 0.37 ml/g;
The total pore volume, measured by mercury porosimetry, is 0.34 ml/g;
The mean pore diameter, measured by mercury porosimetry is 75 A;

The ratio between volume V2, measured by mercury porosimetry, encompassed between Dmean−30 A and Dmean+30 A to the total pore volume that is also measured by mercury porosimetry, is 0.87;
The volume V3, measured by mercury porosimetry, encompassed in the pores with diameters of more than D mean+30 A is 0.045 ml/g;
The volume V6, measured by mercury porosimetry, encompassed in the pores with diameters of more than D mean+15 A is 0.05 ml/g;
The pore volume, measured by mercury porosimetry, encompassed in the pores with diameters of more than 140 A is 0.04 ml/g;
The pore volume, measured by mercury porosimetry, encompassed in the pores with diameters of more than 160 A is 0.0385 ml/g;
The pore volume, measured by mercury porosimetry, encompassed in the pores with diameters of more than 200 A is 0.038 ml/g;
The pore volume, measured by mercury porosimetry, encompassed in the pores with diameters of more than 500 A is 0.032 ml/g;
The X diffraction diagram contains:
the main lines that are characteristic of the gamma aluminas, it contains peaks at d between 1.39 to 1.40 A and at d between 1.97 A to 2.00 A;
the main lines that are characteristic of the US type zeolite Z1.
the Na content is 190+/−20 ppm. The S content is 800 ppm.

Example 2

Preparation of Catalyst C2, in Accordance with the Invention

The alumina-silica matrix used for the preparation of the catalyst C2 is the alumina-silica AS1 AS1 defined in the example 1.
Zeolite Z2
We use a USY type zeolite Z2 as described in the U.S. Pat. No. 5,601,798. This zeolite is prepared according to the method described in the example 52 table 16. The mesopore volume obtained is 0.36 cm3/g. The mesh parameter a=24.34 A, with a crystallinity rate of 75%.
Support Shaping
5 g of zeolite Z2 and 95 g of the alumina-silica matrix AS1 are mixed with respect to the solid material as described above. The S2 support shaping is identical to the S1 support shaping.
The support S2, containing 5% of zeolite Z2 is then obtained with respect to the anhydrous mass. The mass composition of the support S1 in anhydrous product is 66.7% Al2O3 and 33.3% SiO2.
Preparation of the Hydrocracking Catalyst in Accordance with the Invention C2
The catalyst C2 is obtained by dry impregnation of the support S2. The preparation of the catalyst C2 is identical to the preparation of the catalyst C1 of the example 1. The final WO3, NiO, P2O5 of the catalyst C2 are 24.9%, 3.8% and 2% by weight.
The characteristics of the catalyst C2 are the following ones:
The BET specific surface area is 250 m2/g,
The total pore volume, measured by nitrogen porosimetry, is 0.36 ml/g;
The total pore volume, measured by mercury porosimetry, is 0.33 ml/g;

The mean pore diameter, measured by mercury porosimetry is 75 A;
The ratio between volume V2, measured by mercury porosimetry, encompassed between Dmean−30 A and Dmean+30 A to the total pore volume that is also measured by mercury porosimetry, is 0.87;
The volume V3, measured by mercury porosimetry, encompassed in the pores with diameters of more than D mean+30 A is 0.045 ml/g;
The volume V6, measured by mercury porosimetry, encompassed in the pores with diameters of more than D mean+15 A is 0.05 ml/g;
The pore volume, measured by mercury porosimetry, encompassed in the pores with diameters of more than 140 A is 0.04 ml/g;
The pore volume, measured by mercury porosimetry, encompassed in the pores with diameters of more than 160 A is 0.0375 ml/g;
The pore volume, measured by mercury porosimetry, encompassed in the pores with diameters of more than 200 A is 0.037 ml/g;
The pore volume, measured by mercury porosimetry, encompassed in the pores with diameters of more than 500 A is 0.03 ml/g;
The X diffraction diagram contains:
the main lines that are characteristic of the gamma aluminas, it contains peaks at d between 1.39 to 1.40 A and at d between 1.97 A to 2.00 A;
the main lines that are characteristic of the US type zeolite Z2.
the Na content is 190+/−20 ppm. The S content is 800 ppm Example 3

Preparation of Catalyst C3, in Accordance with the Invention

The alumina-silica matrix used for the preparation of the catalyst C3 is the alumina-silica AS1 defined in the example 1.
Zeolite Z3
We use a USY type zeolite Z3 with a ratio Si/Al measured by FX of 73, with a content of sodium of 102 ppm, with a mesh parameter a=24.15 A, with a crystallinity rate of 44% and with a BET surface of 783 m2/g.
Support Shaping
25 g of zeolite Z3 and 75 g of the alumina-silica matrix AS1 are mixed with respect to the solid material as described above. The S3 support shaping is identical to the S1 support shaping of the example 1.
The support S3, containing 25% of zeolite Z2 is then obtained with respect to the anhydrous mass. The mass composition of the support S3 in anhydrous product is 52.6% Al2O3 and 47.4% SiO2.
Preparation of the Hydrocracking Catalyst in Accordance with the Invention C3
The catalyst C3 is obtained by dry impregnation of the support S3. The preparation of the catalyst C3 is identical to the preparation of the catalyst C1 of the example 1. The final WO3, NiO, P2O5 of the catalyst C3 are 26%, 4% and 2% by weight.
The characteristics of the catalyst C3 are the following ones:
The BET specific surface area is 365 m2/g,
The total pore volume, measured by nitrogen porosimetry, is 0.38 ml/g;

The total pore volume, measured by mercury porosimetry, is 0.32 ml/g;
The mean pore diameter, measured by mercury porosimetry is 77 A;
The ratio between volume V2, measured by mercury porosimetry, encompassed between Dmean30A and Dmean+30A to the total pore volume that is also measured by mercury porosimetry, is 0.87;
The volume V3, measured by mercury porosimetry, encompassed in the pores with diameters of more than D mean+30 A is 0.045 ml/g;
The volume V6, measured by mercury porosimetry, encompassed in the pores with diameters of more than D mean+15 A is 0.05 ml/g;
The pore volume, measured by mercury porosimetry, encompassed in the pores with diameters of more than 140 A is 0.04 ml/g;
The pore volume, measured by mercury porosimetry, encompassed in the pores with diameters of more than 160 A is 0.038 ml/g;
The pore volume, measured by mercury porosimetry, encompassed in the pores with diameters of more than 200 A is 0.037 ml/g;
The pore volume, measured by mercury porosimetry, encompassed in the pores with diameters of more than 500 A is 0.031 ml/g;
The X diffraction diagram contains:
the main lines that are characteristic of the gamma aluminas, it contains peaks at d between 1.39 to 1.40 A and at d between 1.97 A to 2.00 A;
the main lines that are characteristic of the US type zeolite Z3.
the Na content is 190+/−20 ppm. The S content is 800 ppm.

Example 4

Preparation of Catalyst C4, not in Accordance with the Invention

The alumina-silica matrix used for the preparation of the catalyst C4 is the alumina-silica AS1 defined in the example 1.
Zeolite Z4
We use a Y type zeolite Z4 with a ratio Si/Al measured by FX of 2.6, with a content of sodium of 1400 ppm, with a mesh parameter a=24.53 A, and with a BET surface of 750 m2/g.
Support Shaping
5 g of zeolite Z4 and 95 g of the alumina-silica matrix AS1 are mixed with respect to the solid material as described above. The S4 support shaping is identical to the S1 support shaping of the example 1.
The support S4, containing 5% of zeolite Z4 is then obtained with respect to the anhydrous mass. The mass composition of the support S4 in anhydrous product is 66.5% Al2O3 and 33.5% SiO2.
Preparation of the Hydrocracking Catalyst in Accordance with the Invention C4
The catalyst C4 is obtained by dry impregnation of the support S4. The preparation of the catalyst C4 is identical to the preparation of the catalyst C1 of the example 1. The final WO3, NiO, P2O5 of the catalyst C4 are 25.9%, 3.9% and 2% by weight.
The characteristics of the catalyst C4 are the following ones:
The BET specific surface area is 210 m2/g,
The total pore volume, measured by nitrogen porosimetry, is 0.33 ml/g;

The total pore volume, measured by mercury porosimetry, is 0.32 ml/g;
The mean pore diameter, measured by mercury porosimetry is 75 A;
The ratio between volume V2, measured by mercury porosimetry, encompassed between Dmean−30A and Dmean+30 A to the total pore volume that is also measured by mercury porosimetry, is 0.87;
The volume V3, measured by mercury porosimetry, encompassed in the pores with diameters of more than D mean+30 A is 0.045 ml/g;
The volume V6, measured by mercury porosimetry, encompassed in the pores with diameters of more than D mean+15 A is 0.05 ml/g;
The pore volume, measured by mercury porosimetry, encompassed in the pores with diameters of more than 140 A is 0.04 ml/g;
The pore volume, measured by mercury porosimetry, encompassed in the pores with diameters of more than 160 A is 0.038 ml/g;
The pore volume, measured by mercury porosimetry, encompassed in the pores with diameters of more than 200 A is 0.036 ml/g;
The pore volume, measured by mercury porosimetry, encompassed in the pores with diameters of more than 500 A is 0.030 ml/g;
The X diffraction diagram contains
the main lines that are characteristic of the gamma aluminas, it contains peaks at d between 1.39 to 1.40 A and at d between 1.97 A to 2.00 A;
the main lines that are characteristic of the US type zeolite Z4.
the Na content is 190+/−20 ppm. The S content is 800 ppm.

Example 5

Preparation of Catalyst C5, in Accordance with the Invention

Synthesis of a Silica-Alumina Matrix SA2
The SA2 matrix is obtained by the following way.
The alumina hydroxide powder was prepared according to the process described in the patent WO 00/01617. The size of the mean particles of the alumina hydroxide particles measured by laser granulometry is 40 microns. This powder ix mixed to a silica soil prepared by exchange on an ion exchange resin, the filtered on a resin with a porosity 2. The silica soil and alumina hydroxide powder are added in order to obtain a final composition of the alumina-silica matrix in anhydrous product of 60% Al2O3-40% SiO2. This suspension is then filtered so as to reduce the quantity of water of the mixed cake.
Zeolite Z1
We use the zeolite Z1 defined in the example 1.
Support Shaping S5
5 g of zeolite Z3 and 95 g of the alumina-silica matrix AS2 are mixed with respect to the solid material as described above. The S5 support shaping is identical to the S1 support shaping of the example 1.
The support S5, containing 5% of zeolite Z1 is then obtained with respect to the anhydrous mass. The mass composition of the support S5 in anhydrous product is 57% Al2O3 and 43% SiO2.
Preparation of the Hydrocracking Catalyst in Accordance with the Invention C5
The catalyst C5 is obtained by dry impregnation of the support S5. The preparation of the catalyst C5 is identical to the preparation of the catalyst C1 of the example 1. The final WO3, NiO, P2O5 of the catalyst C5 are 24.7%, 3.6% and 2% by weight.

The characteristics of the catalyst C5 are the following ones:
The BET specific surface area is 235 m2/g,
The total pore volume, measured by nitrogen porosimetry, is 0.36 ml/g;
The total pore volume, measured by mercury porosimetry, is 0.34 ml/g;
The mean pore diameter, measured by mercury porosimetry is 72 A;
The ratio between volume V2, measured by mercury porosimetry, encompassed between Dmean−30 A and Dmean+30 A to the total pore volume that is also measured by mercury porosimetry, is 0.9;
The volume V3, measured by mercury porosimetry, encompassed in the pores with diameters of more than D mean+30 A is 0.072 ml/g;
The volume V6, measured by mercury porosimetry, encompassed in the pores with diameters of more than D mean+15 A is 0.087 ml/g;
The pore volume, measured by mercury porosimetry, encompassed in the pores with diameters of more than 140 A is 0.055 ml/g;
The pore volume, measured by mercury porosimetry, encompassed in the pores with diameters of more than 160 A is 0.053 ml/g;
The pore volume, measured by mercury porosimetry, encompassed in the pores with diameters of more than 200 A is 0.051 ml/g;
The pore volume, measured by mercury porosimetry, encompassed in the pores with diameters of more than 500 A is 0.045 ml/g;
The X diffraction diagram contains:
  the main lines that are characteristic of the gamma aluminas, it contains peaks at d between 1.39 to 1.40 A and at d between 1.97 A to 2.00 A;
  the main lines that are characteristic of the US type zeolite Z1.
the Na content is 190+/−20 ppm. The S content is 800 ppm.

Example 6

Preparation of Catalyst C6, in Accordance with the Invention

The alumina-silica matrix used for the preparation of the catalyst C6 is the alumina-silica AS2 defined in the example 5.
Zeolite Z2
We use the zeolite Z2 defined in the example 2.
Support Shaping S6
5 g of zeolite Z2 and 95 g of the alumina-silica matrix AS2 are mixed with respect to the solid material as described above. The S6 support shaping is identical to the S1 support shaping of the example 1.
The support S6, containing 5% of zeolite Z2 is then obtained with respect to the anhydrous mass. The mass composition of the support S6 in anhydrous product is 57% Al2O3 and 43% SiO2.
Preparation of the Hydrocracking Catalyst in Accordance with the Invention C6
The catalyst C6 is obtained by dry impregnation of the support S6. The preparation of the catalyst C6 is identical to the preparation of the catalyst C1 of the example 1. The final WO3, NiO, P2O5 of the catalyst C6 are 24.6%, 3.6% and 2% by weight.

The characteristics of the catalyst C6 are the following ones:
The BET specific surface area is 210 m2/g,
The total pore volume, measured by nitrogen porosimetry, is 0.35 ml/g;
The total pore volume, measured by mercury porosimetry, is 0.33 ml/g;
The mean pore diameter, measured by mercury porosimetry is 70 A;
The ratio between volume V2, measured by mercury porosimetry, encompassed between Dmean−30 A and Dmean+30 A to the total pore volume that is also measured by mercury porosimetry, is 0.9;
The volume V3, measured by mercury porosimetry, encompassed in the pores with diameters of more than D mean+30 A is 0.072 ml/g;
The volume V6, measured by mercury porosimetry, encompassed in the pores with diameters of more than D mean+15 A is 0.087 ml/g;
The pore volume, measured by mercury porosimetry, encompassed in the pores with diameters of more than 140 A is 0.055 ml/g;
The pore volume, measured by mercury porosimetry, encompassed in the pores with diameters of more than 160 A is 0.053 ml/g;
The pore volume, measured by mercury porosimetry, encompassed in the pores with diameters of more than 200 A is 0.051 ml/g;
The pore volume, measured by mercury porosimetry, encompassed in the pores with diameters of more than 500 A is 0.044 ml/g;
The X diffraction diagram contains:
  the main lines that are characteristic of the gamma aluminas, it contains peaks at d between 1.39 to 1.40 A and at d between 1.97 A to 2.00 A;
  the main lines that are characteristic of the US type zeolite Z2.
the Na content is 190+/−20 ppm. The S content is 800 ppm.

Example 7

Preparation of Catalyst C7, in Accordance with the Invention

The alumina-silica matrix used for the preparation of the catalyst C7 is the alumina-silica AS2 defined in the example 5.
Zeolite Z3
We use the zeolite Z3 defined in the example 3.
Support Shaping S7
25 g of zeolite Z3 and 75 g of the alumina-silica matrix AS2 are mixed with respect to the solid material as described above. The S7 support shaping is identical to the S1 support shaping of the example 1.
The support S7, containing 25% of zeolite Z3 is then obtained with respect to the anhydrous mass. The mass composition of the support S7 in anhydrous product is 45% Al2O3 and 55% SiO2.
Preparation of the Hydrocracking Catalyst in Accordance with the Invention C7
The catalyst C7 is obtained by dry impregnation of the support S7. The preparation of the catalyst C7 is identical to the preparation of the catalyst C1 of the example 1. The final WO3, NiO, P2O5 of the catalyst C7 are 24.5%, 3.5% and 2% by weight.

The characteristics of the catalyst C7 are the following ones:
The BET specific surface area is 360 m2/g,
The total pore volume, measured by nitrogen porosimetry, is 0.38 ml/g;
The total pore volume, measured by mercury porosimetry, is 0.35 ml/g;
The mean pore diameter, measured by mercury porosimetry is 75 A;
The ratio between volume V2, measured by mercury porosimetry, encompassed between Dmean−30 A and Dmean+30 A to the total pore volume that is also measured by mercury porosimetry, is 0.9;
The volume V3, measured by mercury porosimetry, encompassed in the pores with diameters of more than D mean+30 A is 0.072 ml/g;
The volume V6, measured by mercury porosimetry, encompassed in the pores with diameters of more than D mean+15 A is 0.087 ml/g;
The pore volume, measured by mercury porosimetry, encompassed in the pores with diameters of more than 140 A is 0.055 ml/g;
The pore volume, measured by mercury porosimetry, encompassed in the pores with diameters of more than 160 A is 0.052 ml/g;
The pore volume, measured by mercury porosimetry, encompassed in the pores with diameters of more than 200 A is 0.050 ml/g;
The pore volume, measured by mercury porosimetry, encompassed in the pores with diameters of more than 500 A is 0.042 ml/g;
The X diffraction diagram contains:
the main lines that are characteristic of the gamma aluminas, it contains peaks at d between 1.39 to 1.40 A and at d between 1.97 A to 2.00 A;
the main lines that are characteristic of the US type zeolite Z3.
the Na content is 190+/−20 ppm. The S content is 800 ppm.

Example 8

Preparation of Catalyst C8, not in Accordance with the Invention

The alumina-silica matrix used for the preparation of the catalyst C8 is the alumina-silica AS2 defined in the example 5.
Zeolite Z4
We use the zeolite Z4 defined in the example 4.
Support Shaping S8
5 g of zeolite Z4 and 95 g of the alumina-silica matrix AS2 are mixed with respect to the solid material as described above. The S8 support shaping is identical to the S1 support shaping of the example 1.
The support S8, containing 5% of zeolite Z4 is then obtained with respect to the anhydrous mass. The mass composition of the support S8 in anhydrous product is 57% Al2O3 and 43% SiO2.
Preparation of the Hydrocracking Catalyst in Accordance with the Invention C8
The catalyst C8 is obtained by dry impregnation of the support S8. The preparation of the catalyst C8 is identical to the preparation of the catalyst C1 of the example 1. The final WO3, NiO, P2O5 of the catalyst C8 are 24.5%, 3.5% and 2% by weight.

The characteristics of the catalyst C8 are the following ones:
The BET specific surface area is 210 m2/g,
The total pore volume, measured by nitrogen porosimetry, is 0.38 ml/g;
The total pore volume, measured by mercury porosimetry, is 0.35 ml/g;
The mean pore diameter, measured by mercury porosimetry is 76 A;
The ratio between volume V2, measured by mercury porosimetry, encompassed between Dmean−30 A and Dmean+30 A to the total pore volume that is also measured by mercury porosimetry, is 0.9;
The volume V3, measured by mercury porosimetry, encompassed in the pores with diameters of more than D mean+30 A is 0.072 ml/g;
The volume V6, measured by mercury porosimetry, encompassed in the pores with diameters of more than D mean+15 A is 0.087 ml/g;
The pore volume, measured by mercury porosimetry, encompassed in the pores with diameters of more than 140 A is 0.055 ml/g;
The pore volume, measured by mercury porosimetry, encompassed in the pores with diameters of more than 160 A is 0.052 ml/g;
The pore volume, measured by mercury porosimetry, encompassed in the pores with diameters of more than 200 A is 0.050 ml/g;
The pore volume, measured by mercury porosimetry, encompassed in the pores with diameters of more than 500 A is 0.045 ml/g;
The X diffraction diagram contains:
the main lines that are characteristic of the gamma aluminas, it contains peaks at d between 1.39 to 1.40 A and at d between 1.97 A to 2.00 A;
the main lines that are characteristic of the US type zeolite Z4.
the Na content is 190+/−20 ppm. The S content is 800 ppm.

Example 9

Preparation of Catalyst C9, not in Accordance with the Invention

Synthesis of a Silica-Alumina Matrix AS3
The AS3 matrix is obtained by the following way.
The alumina-silica gel are prepared by mixing water and sodium hydroxide silicate, by sending this mixture on a ion exchange resin. A aluminium chloride hexahydrate is added in water to a silica soil decationized. In order to obtain a gel, ammoniac is added, then the precipitate is filtered and it is washed with a concentrated ammoniac and water solution until the conductivity of the water used for the washing is constant. The gel obtained is mixed with Pural bohemite powder so that the final composition of the alumina-silica matrix in anhydrous product is equal to 70% Al2O3-30% SiO2. This suspension is passed through a colloid mill in presence of nitric acid so that the content of nitric acid of the suspension when coming out from the mill is 8% with respect to the alumina-silica mixed solid. This suspension is then filtered so as to reduce the quantity of water of the mixed cake.
Zeolite Z1
We use the zeolite Z1 defined in the example 1.
Support Shaping S9
5 g of zeolite Z1 and 95 g of the alumina-silica matrix AS3 are mixed with respect to the solid material as described above. The S9 support shaping is identical to the S1 support shaping of the example 1.

The support S9, containing 5% of zeolite Z1 is then obtained with respect to the anhydrous mass. The mass composition of the support S6 in anhydrous product is 66.5% Al2O3 and 33.5% SiO2.

Preparation of the Hydrocracking Catalyst in Accordance with the Invention C9

The catalyst C9 is obtained by dry impregnation of the support S9. The preparation of the catalyst C9 is identical to the preparation of the catalyst C1 of the example 1. The final WO3, NiO, P2O5 of the catalyst C9 are 24.7%, 3.6% and 2% by weight.

The characteristics of the catalyst C9 are the following ones:
The BET specific surface area is 205 m2/g,
The total pore volume, measured by nitrogen porosimetry, is 0.33 ml/g;
The total pore volume, measured by mercury porosimetry, is 0.32 ml/g;
The mean pore diameter, measured by mercury porosimetry is 69 A;
The ratio between volume V2, measured by mercury porosimetry, encompassed between Dmean−30 A and Dmean+30 A to the total pore volume that is also measured by mercury porosimetry, is 0.95;
The volume V3, measured by mercury porosimetry, encompassed in the pores with diameters of more than D mean+30 A is 0.018 ml/g;
The volume V6, measured by mercury porosimetry, encompassed in the pores with diameters of more than D mean+15 A is 0.021 ml/g;
The pore volume, measured by mercury porosimetry, encompassed in the pores with diameters of more than 140 A is 0.012 ml/g;
The pore volume, measured by mercury porosimetry, encompassed in the pores with diameters of more than 160 A is 0.010 ml/g;
The pore volume, measured by mercury porosimetry, encompassed in the pores with diameters of more than 200 A is 0.006 ml/g;
The pore volume, measured by mercury porosimetry, encompassed in the pores with diameters of more than 500 A is 0.002 ml/g;
The X diffraction diagram contains:
the main lines that are characteristic of the gamma aluminas, it contains peaks at d between 1.39 to 1.40 A and at d between 1.97 A to 2.00 A;
the main lines that are characteristic of the zeolite Z1.
the Na content is 190+/−20 ppm. The S content is 800 ppm.

Example 10

Preparation of Catalyst C10, in Accordance with the Invention

Synthesis of a Silica-Alumina Matrix AS4

The AS4 matrix is a alumina-silica powder having a chemical weight composition in anhydrous product of 60% Al2O3 and of 40% SiO2. Its Na content is 100-120 ppm weight. Its Specific surface area is 520 m2/g. Its total porous volume, measured by mercury porosimetry is 0.83 cm3/g. The porous distribution is bimodal. In the mesopore range, a large peak between 4 and 15 nm with a maximum at 7 nm is observed. For the support, the pores with a diameter of more than 50 nm represent 40% of the total porous volume.

Zeolite Z1

We use the zeolite Z1 defined in the example 1.

Support Shaping S10

5 g of zeolite Z1 and 95 g of the alumina-silica matrix AS4 are mixed with respect to the solid material as described above. The S10 support shaping is identical to the S1 support shaping of the example 1.

The support S10, containing 5% of zeolite Z1 is then obtained with respect to the anhydrous mass. The mass composition of the support S10 in anhydrous product is 57% Al2O3 and 43% SiO2.

Preparation of the Hydrocracking Catalyst in Accordance with the Invention C10

The catalyst CIO is obtained by dry impregnation of the support S10. The preparation of the catalyst C10 is identical to the preparation of the catalyst C1 of the example 1. The final WO3, NiO, P2O5 of the catalyst C10 are 24.7%, 3.6% and 2% by weight.

The characteristics of the catalyst C10 are the following ones:
The BET specific surface area is 255 m2/g,
The total pore volume, measured by nitrogen porosimetry, is 0.85 ml/g;
The total pore volume, measured by mercury porosimetry, is 0.83 ml/g;
The mean pore diameter, measured by mercury porosimetry is 85 A;
The ratio between volume V2, measured by mercury porosimetry, encompassed between Dmean−30 A and Dmean+30 A to the total pore volume that is also measured by mercury porosimetry, is 0.4;
The volume V3, measured by mercury porosimetry, encompassed in the pores with diameters of more than D mean+30 A is 0.41 ml/g;
The volume V6, measured by mercury porosimetry, encompassed in the pores with diameters of more than D mean+15 A is 0.43 ml/g;
The pore volume, measured by mercury porosimetry, encompassed in the pores with diameters of more than 140 A is 0.37 ml/g;
The pore volume, measured by mercury porosimetry, encompassed in the pores with diameters of more than 160 A is 0.35 ml/g;
The pore volume, measured by mercury porosimetry, encompassed in the pores with diameters of more than 200 A is 0.34 ml/g;
The pore volume, measured by mercury porosimetry, encompassed in the pores with diameters of more than 500 A is 0.33 ml/g;
The X diffraction diagram contains:
the main lines that are characteristic of the gamma aluminas, it contains peaks at d between 1.39 to 1.40 A and at d between 1.97 A to 2.00 A;
the main lines that are characteristic of the zeolite Z1.
the Na content is 190+/−20 ppm. The S content is 800 ppm.

Example 11

Preparation of Catalyst C11, in Accordance with the Invention

The alumina-silica matrix used for the preparation of the catalyst C11 is the alumina-silica AS1 defined in the example 1.

Zeolite Z1

We use the zeolite Z1 defined in the example 1.

Support Shaping S11

5 g of zeolite Z1 and 95 g of the alumina-silica matrix AS1 are mixed with respect to the solid material as described above. The S11 support shaping is identical to the S1 support shaping of the example 1.

The support S11, containing 5% of zeolite Z1 is then obtained with respect to the anhydrous mass. The mass composition of the support S11 in anhydrous product is 66.5% $Al_2O_3$ and 33.5% $SiO_2$.

Preparation of the Hydrocracking Catalyst in Accordance with the Invention C11

The catalyst C11 is obtained by dry impregnation of the support S11. The preparation of the catalyst C11 is identical to the preparation of the catalyst C1 of the example 1. The final $WO_3$, NiO, $P_2O_5$ of the catalyst C11 are 24.7%, 3.6% and 2% by weight.

The characteristics of the catalyst C11 are the following ones:
The BET specific surface area is 252 m2/g,
The total pore volume, measured by nitrogen porosimetry, is 0.38 ml/g;
The total pore volume, measured by mercury porosimetry, is 0.35 ml/g;
The mean pore diameter, measured by mercury porosimetry is 75 A;
The ratio between volume V2, measured by mercury porosimetry, encompassed between Dmean−30 A and Dmean+30 A to the total pore volume that is also measured by mercury porosimetry, is 0.87;
The volume V3, measured by mercury porosimetry, encompassed in the pores with diameters of more than D mean+30 A is 0.045 ml/g;
The volume V6, measured by mercury porosimetry, encompassed in the pores with diameters of more than D mean+15 A is 0.05 ml/g;
The pore volume, measured by mercury porosimetry, encompassed in the pores with diameters of more than 140 A is 0.04 ml/g;
The pore volume, measured by mercury porosimetry, encompassed in the pores with diameters of more than 160 A is 0.0385 ml/g;
The pore volume, measured by mercury porosimetry, encompassed in the pores with diameters of more than 200 A is 0.038 ml/g;
The pore volume, measured by mercury porosimetry, encompassed in the pores with diameters of more than 500 A is 0.032 ml/g;
The X diffraction diagram contains:
 the main lines that are characteristic of the gamma aluminas, it contains peaks at d between 1.39 to 1.40 A and at d between 1.97 A to 2.00 A;
 the main lines that are characteristic of the zeolite Z1.
the Na content is 190+/−20 ppm. The S content is 800 ppm.

Example 12

Preparation of Catalyst C12, in Accordance with the Invention

The alumina-silica matrix used for the preparation of the catalyst C12 is the alumina-silica AS1 defined in the example 1.
Zeolite Z1
We use the zeolite Z1 defined in the example 1.
Support Shaping S12
5 g of zeolite Z1 and 95 g of the alumina-silica matrix AS1 are mixed with respect to the solid material as described above. The S12 support shaping is identical to the S1 support shaping of the example 1.

The support S12, containing 5% of zeolite Z1 is then obtained with respect to the anhydrous mass. The mass composition of the support S12 in anhydrous product is 66.5% $Al_2O_3$ and 33.5% $SiO_2$.

Preparation of the Hydrocracking Catalyst in Accordance with the Invention C12

The catalyst C12 is obtained by dry impregnation of the support S12. The preparation of the catalyst C12 is identical to the preparation of the catalyst C1 of the example 1. The final $WO_3$, NiO, $P_2O_5$ of the catalyst C12 are 24.7%, 3.6% and 5% by weight.

The characteristics of the catalyst C12 are the following ones:
The BET specific surface area is 240 m2/g,
The total pore volume, measured by nitrogen porosimetry, is 0.37 ml/g;
The total pore volume, measured by mercury porosimetry, is 0.35 ml/g;
The mean pore diameter, measured by mercury porosimetry is 74 A;
The ratio between volume V2, measured by mercury porosimetry, encompassed between Dmean−30 A and Dmean+30 A to the total pore volume that is also measured by mercury porosimetry, is 0.87;
The volume V3, measured by mercury porosimetry, encompassed in the pores with diameters of more than D mean+30 A is 0.045 ml/g;
The volume V6, measured by mercury porosimetry, encompassed in the pores with diameters of more than D mean+15 A is 0.05 ml/g;
The pore volume, measured by mercury porosimetry, encompassed in the pores with diameters of more than 140 A is 0.04 ml/g;
The pore volume, measured by mercury porosimetry, encompassed in the pores with diameters of more than 160 A is 0.0385 ml/g;
The pore volume, measured by mercury porosimetry, encompassed in the pores with diameters of more than 200 A is 0.038 ml/g;
The pore volume, measured by mercury porosimetry, encompassed in the pores with diameters of more than 500 A is 0.031 ml/g;
The X diffraction diagram contains:
 the main lines that are characteristic of the gamma aluminas, it contains peaks at d between 1.39 to 1.40 A and at d between 1.97 A to 2.00 A;
 the main lines that are characteristic of the zeolite Z1.
the Na content is 190+/−20 ppm. The S content is 800 ppm.

Example 13

Preparation of Catalyst C13, in Accordance with the Invention

The alumina-silica matrix used for the preparation of the catalyst C13 is the alumina-silica AS1 defined in the example 1.
Zeolite Z1
We use the zeolite Z1 defined in the example 1.
Support Shaping S13
5 g of zeolite Z1 and 95 g of the alumina-silica matrix AS1 are mixed with respect to the solid material as described above. The S13 support shaping is identical to the S1 support shaping of the example 1.

The support S13, containing 5% of zeolite Z1 is then obtained with respect to the anhydrous mass. The mass composition of the support S13 in anhydrous product is 66.5% Al2O3 and 33.5% SiO2.

Preparation of the Hydrocracking Catalyst in Accordance with the Invention C13

The catalyst C13 is obtained by dry impregnation of the support S13. The preparation of the catalyst C13 is identical to the preparation of the catalyst C1 of the example 1. The final WO3, NiO, P2O5 of the catalyst C13 are 24.7%, 3.6% and 0% by weight.

The characteristics of the catalyst C10 are the following ones:
The BET specific surface area is 248 m2/g,
The total pore volume, measured by nitrogen porosimetry, is 0.37 ml/g;
The total pore volume, measured by mercury porosimetry, is 0.35 ml/g;
The mean pore diameter, measured by mercury porosimetry is 74 A;
The ratio between volume V2, measured by mercury porosimetry, encompassed between Dmean−30 A and Dmean+30 A to the total pore volume that is also measured by mercury porosimetry, is 0.87;
The volume V3, measured by mercury porosimetry, encompassed in the pores with diameters of more than D mean+30 A is 0.045 ml/g;
The volume V6, measured by mercury porosimetry, encompassed in the pores with diameters of more than D mean+15 A is 0.05 ml/g;
The pore volume, measured by mercury porosimetry, encompassed in the pores with diameters of more than 140 A is 0.04 ml/g;
The pore volume, measured by mercury porosimetry, encompassed in the pores with diameters of more than 160 A is 0.0385 ml/g;
The pore volume, measured by mercury porosimetry, encompassed in the pores with diameters of more than 200 A is 0.038 ml/g;
The pore volume, measured by mercury porosimetry, encompassed in the pores with diameters of more than 500 A is 0.031 ml/g;
The X diffraction diagram contains:
  the main lines that are characteristic of the gamma aluminas, it contains peaks at d between 1.39 to 1.40 A and at d between 1.97 A to 2.00 A;
  the main lines that are characteristic of the zeolite Z1.
the Na content is 190+/−20 ppm. The S content is 800 ppm.

Example 14

Preparation of Catalyst C14, not in Accordance with the Invention

The alumina-silica matrix used for the preparation of the catalyst C14 is the alumina-silica AS1 defined in the example 1.
Zeolite Z1
We use the zeolite Z1 defined in the example 1.
Support Shaping S14
5 g of zeolite Z1 and 95 g of the alumina-silica matrix AS1 are mixed with respect to the solid material as described above. The S14 support shaping is identical to the S1 support shaping of the example 1.

The support S14, containing 5% of zeolite Z1 is then obtained with respect to the anhydrous mass. The mass composition of the support S14 in anhydrous product is 66.5% Al2O3 and 33.5% SiO2.

Preparation of the Hydrocracking Catalyst in Accordance with the Invention C14

The catalyst C14 is obtained by dry impregnation of the support S14. The preparation of the catalyst C14 is identical to the preparation of the catalyst C1 of the example 1. The final WO3, NiO, P2O5 of the catalyst C14 are 24.7%, 3.6% and 6.5% by weight.

The characteristics of the catalyst C14 are the following ones:
The BET specific surface area is 230 m2/g,
The total pore volume, measured by nitrogen porosimetry, is 0.37 ml/g;
The total pore volume, measured by mercury porosimetry, is 0.35 ml/g;
The mean pore diameter, measured by mercury porosimetry is 73 A;
The ratio between volume V2, measured by mercury porosimetry, encompassed between Dmean−30 A and Dmean+30 A to the total pore volume that is also measured by mercury porosimetry, is 0.87;
The volume V3, measured by mercury porosimetry, encompassed in the pores with diameters of more than D mean+30 A is 0.045 ml/g;
The volume V6, measured by mercury porosimetry, encompassed in the pores with diameters of more than D mean+15 A is 0.05 ml/g;
The pore volume, measured by mercury porosimetry, encompassed in the pores with diameters of more than 140 A is 0.04 ml/g;
The pore volume, measured by mercury porosimetry, encompassed in the pores with diameters of more than 160 A is 0.0385 ml/g;
The pore volume, measured by mercury porosimetry, encompassed in the pores with diameters of more than 200 A is 0.038 ml/g;
The pore volume, measured by mercury porosimetry, encompassed in the pores with diameters of more than 500 A is 0.032 ml/g;
The X diffraction diagram contains:
  the main lines that are characteristic of the gamma aluminas, it contains peaks at d between 1.39 to 1.40 A and at d between 1.97 A to 2.00 A;
  the main lines that are characteristic of the zeolite Z1.
the Na content is 190+/−20 ppm. The S content is 800 ppm.

Example 15

Preparation of Catalyst C15, in Accordance with the Invention

The alumina-silica matrix used for the preparation of the catalyst C15 is the alumina-silica AS1 defined in the example 1.
Zeolite Z3
We use the zeolite Z3 defined in the example 3.
Support Shaping S15
5 g of zeolite Z1 and 95 g of the alumina-silica matrix AS1 are mixed with respect to the solid material as described above. The S15 support shaping is identical to the S1 support shaping of the example 1.

The support S15, containing 5% of zeolite Z3 is then obtained with respect to the anhydrous mass. The mass composition of the support S15 in anhydrous product is 66.5% Al2O3 and 33.5% SiO2.

Preparation of the Hydrocracking Catalyst in Accordance with the Invention C15

The catalyst C15 is obtained by dry impregnation of the support S15. The preparation of the catalyst C15 is identical to the preparation of the catalyst C1 of the example 1. The final WO3, NiO, P2O5 of the catalyst C15 are 26%, 4.0% and 2% by weight.

The characteristics of the catalyst C15 are the following ones:
The BET specific surface area is 365 m2/g,
The total pore volume, measured by nitrogen porosimetry, is 0.38 ml/g;
The total pore volume, measured by mercury porosimetry, is 0.32 ml/g;
The mean pore diameter, measured by mercury porosimetry is 77 A;
The ratio between volume V2, measured by mercury porosimetry, encompassed between Dmean−30 A and Dmean+30 A to the total pore volume that is also measured by mercury porosimetry, is 0.87;
The volume V3, measured by mercury porosimetry, encompassed in the pores with diameters of more than D mean+30 A is 0.045 ml/g;
The volume V6, measured by mercury porosimetry, encompassed in the pores with diameters of more than D mean+15 A is 0.05 ml/g;
The pore volume, measured by mercury porosimetry, encompassed in the pores with diameters of more than 140 A is 0.04 ml/g;
The pore volume, measured by mercury porosimetry, encompassed in the pores with diameters of more than 160 A is 0.038 ml/g;
The pore volume, measured by mercury porosimetry, encompassed in the pores with diameters of more than 200 A is 0.037 ml/g;
The pore volume, measured by mercury porosimetry, encompassed in the pores with diameters of more than 500 A is 0.031 ml/g;
The X diffraction diagram contains:
the main lines that are characteristic of the gamma aluminas, it contains peaks at d between 1.39 to 1.40 A and at d between 1.97 A to 2.00 A;
the main lines that are characteristic of the zeolite Z3.
the Na content is 190+/−20 ppm. The S content is 800 ppm.

Example 16

Preparation of Catalyst C16, in Accordance with the Invention

The alumina-silica matrix used for the preparation of the catalyst C16 is the alumina-silica AS2 defined in the example 5.
Zeolite Z3
We use the zeolite Z3 defined in the example 3.
Support Shaping S16
5 g of zeolite Z3 and 95 g of the alumina-silica matrix AS2 are mixed with respect to the solid material as described above. The S16 support shaping is identical to the S1 support shaping of the example 1.

The support S16, containing 5% of zeolite Z3 is then obtained with respect to the anhydrous mass. The mass composition of the support S16 in anhydrous product is 66.5% Al2O3 and 33.5% SiO2.

Preparation of the Hydrocracking Catalyst in Accordance with the Invention C16

The catalyst C16 is obtained by dry impregnation of the support S16. The preparation of the catalyst C16 is identical to the preparation of the catalyst C1 of the example 1. The final WO3, NiO, P2O5 of the catalyst C16 are 24.5%, 3.5% and 2% by weight.

The characteristics of the catalyst C16 are the following ones:
The BET specific surface area is 360 m2/g,
The total pore volume, measured by nitrogen porosimetry, is 0.38 ml/g;
The total pore volume, measured by mercury porosimetry, is 0.35 ml/g;
The mean pore diameter, measured by mercury porosimetry is 75 A;
The ratio between volume V2, measured by mercury porosimetry, encompassed between Dmean−30 A and Dmean+30 A to the total pore volume that is also measured by mercury porosimetry, is 0.9;
The volume V3, measured by mercury porosimetry, encompassed in the pores with diameters of more than D mean+30 A is 0.072 ml/g;
The volume V6, measured by mercury porosimetry, encompassed in the pores with diameters of more than D mean+15 A is 0.087 ml/g;
The pore volume, measured by mercury porosimetry, encompassed in the pores with diameters of more than 140 A is 0.055 ml/g;
The pore volume, measured by mercury porosimetry, encompassed in the pores with diameters of more than 160 A is 0.052 ml/g;
The pore volume, measured by mercury porosimetry, encompassed in the pores with diameters of more than 200 A is 0.050 ml/g;
The pore volume, measured by mercury porosimetry, encompassed in the pores with diameters of more than 500 A is 0.042 ml/g;
The X diffraction diagram contains:
the main lines that are characteristic of the gamma aluminas, it contains peaks at d between 1.39 to 1.40 A and at d between 1.97 A to 2.00 A;
the main lines that are characteristic of the zeolite Z3.
the Na content is 190+/−20 ppm. The S content is 800 ppm.

Example 17

Preparation of Catalyst C17, in Accordance with the Invention

The alumina-silica matrix used for the preparation of the catalyst C17 is the alumina-silica AS1 defined in the example 1.
Zeolite Z1
We use the zeolite Z1 defined in the example 1.
Support Shaping S17
5 g of zeolite Z1 and 95 g of the alumina-silica matrix AS1 are mixed with respect to the solid material as described above. The S17 support shaping is identical to the S1 support shaping of the example 1.

The support S17, containing 5% of zeolite Z1 is then obtained with respect to the anhydrous mass. The mass composition of the support S17 in anhydrous product is 66.5% Al2O3 and 33.5% SiO2.

Preparation of the Hydrocracking Catalyst in Accordance with the Invention C17

The catalyst C17 is obtained by dry impregnation of the support S1 in the form of extrudate using a solution containing platinum salts and phosphoric acid H3PO4. The platinum salt is hexacloroplatinic H2PtCl6. After maturation at ambient temperature in a water-saturated atmosphere, the impregnated extrudates were dried at 120° C. overnight then calcined at 500° C. in dry air. The final PtO2, P2O5 of the catalyst C17 are 0.58% and 1% by weight.

The characteristics of the catalyst C17 are the following ones:
The BET specific surface area is 290 m2/g,
The total pore volume, measured by nitrogen porosimetry, is 0.49 ml/g;
The total pore volume, measured by mercury porosimetry, is 0.47 ml/g;
The mean pore diameter, measured by mercury porosimetry is 70 A;
The ratio between volume V2, measured by mercury porosimetry, encompassed between Dmean−30 A and Dmean+30 A to the total pore volume that is also measured by mercury porosimetry, is 0.87;
The volume V3, measured by mercury porosimetry, encompassed in the pores with diameters of more than D mean+30 A is 0.045 ml/g;
The volume V6, measured by mercury porosimetry, encompassed in the pores with diameters of more than D mean+15 A is 0.05 ml/g;
The pore volume, measured by mercury porosimetry, encompassed in the pores with diameters of more than 140 A is 0.04 ml/g;
The pore volume, measured by mercury porosimetry, encompassed in the pores with diameters of more than 160 A is 0.038 ml/g;
The pore volume, measured by mercury porosimetry, encompassed in the pores with diameters of more than 200 A is 0.036 ml/g;
The pore volume, measured by mercury porosimetry, encompassed in the pores with diameters of more than 500 A is 0.030 ml/g;
The X diffraction diagram contains:
  the main lines that are characteristic of the gamma aluminas, it contains peaks at d between 1.39 to 1.40 A and at d between 1.97 A to 2.00 A;
  the main lines that are characteristic of the zeolite Z1.
the Na content is 190+/−20 ppm. The S content is 800 ppm.

Example 18

Preparation of Catalyst C18, in Accordance with the Invention

The alumina-silica matrix used for the preparation of the catalyst C18 is the alumina-silica AS1 defined in the example 1.
Zeolite Z1
We use the zeolite Z1 defined in the example 1.
Support Shaping S18
5 g of zeolite Z1 and 95 g of the alumina-silica matrix AS1 are mixed with respect to the solid material as described above. The S18 support shaping is identical to the S1 support shaping of the example 1.

The support S18, containing 5% of zeolite Z1 is then obtained with respect to the anhydrous mass. The mass composition of the support S18 in anhydrous product is 66.5% Al2O3 and 33.5% $SiO_2$.

Preparation of the Hydrocracking Catalyst in Accordance with the Invention C18

The catalyst C18 is obtained by dry impregnation of the support S18 in the form of extrudate using a solution containing platinum salts and phosphoric acid $H_3PO_4$. The platinum salt is hexacloroplatinic $H_2PtCl_6$. After maturation at ambient temperature in a water-saturated atmosphere, the impregnated extrudates were dried at 120° C. overnight then calcined at 500° C. in dry air. The final $PtO_2$, $P_2O_5$ of the catalyst C17 are 0.58% and 0% by weight.

The characteristics of the catalyst C18 are the following ones:
The BET specific surface area is 292 m2/g,
The total pore volume, measured by nitrogen porosimetry, is 0.49 ml/g;
The total pore volume, measured by mercury porosimetry, is 0.47 ml/g;
The mean pore diameter, measured by mercury porosimetry is 70 A;
The ratio between volume V2, measured by mercury porosimetry, encompassed between Dmean−30 A and Dmean+30 A to the total pore volume that is also measured by mercury porosimetry, is 0.87;
The volume V3, measured by mercury porosimetry, encompassed in the pores with diameters of more than D mean+30 A is 0.045 ml/g;
The volume V6, measured by mercury porosimetry, encompassed in the pores with diameters of more than D mean+15 A is 0.05 ml/g;
The pore volume, measured by mercury porosimetry, encompassed in the pores with diameters of more than 140 A is 0.04 ml/g;
The pore volume, measured by mercury porosimetry, encompassed in the pores with diameters of more than 160 A is 0.038 ml/g;
The pore volume, measured by mercury porosimetry, encompassed in the pores with diameters of more than 200 A is 0.036 ml/g;
The pore volume, measured by mercury porosimetry, encompassed in the pores with diameters of more than 500 A is 0.030 ml/g;
The X diffraction diagram contains:
  the main lines that are characteristic of the gamma aluminas, it contains peaks at d between 1.39 to 1.40 A and at d between 1.97 A to 2.00 A;
  the main lines that are characteristic of the zeolite Z1.
the Na content is 190+/−20 ppm. The S content is 800 ppm.

Example 19

Evaluation of Catalysts C1 to C16 in a Once-Through High Pressure Hydrocracking of a Vacuum Distillate Catalysts C1 to C16 the preparation of which was described in Examples 1 to 16 were used to carry out hydrocracking of a vacuum distillate with the following principal characteristics:

| Nature of feed | Vacuum distillates |
|---|---|
| Density at 15° C. | 0.904 |
| Sulphur, % by weight | 2.52 |
| Nitrogen, ppm by weight | 880 |
| Simulated distillation: | |
| SD: Initial point, ° C. | |
| SD: 05% p, ° C. | 367 |
| SD: 10% p, ° C. | 380 |
| SD: 50% p, ° C. | 443 |
| SD: 90% p, ° C. | 520 |
| SD: End point, ° C. | 690 |

Catalysts C1 to C16 were employed using the process of the invention with a pilot unit comprising 1 fixed traversed bed reactor, the fluids moving from bottom to top (up-flow).

Prior to the hydrocracking test, the catalysts were sulphurized at 120 bars, at 350° C. using a straight run gas oil supplemented with 2% by weight of DMDS.

After sulphurization, the catalytic tests were carried out under the following conditions:
Total pressure 14 MPa
 Hourly space velocity (HSV)=0.7 h 1.
 Required temperature to reach 70% of net conversion.

The catalytic performances were expressed as the net conversion into products with a boiling point of less than 370° C., as the net selectivity for middle distillate, 150-370° C. cut, and as the ratio of gas oil yield/kerosene yield in the middle distillate fraction. They were derived from the results for simulated distillation.

The net conversion, NC, was assumed to be:

NC370° C.=[(% of 370° C.-effluents)−(% of 370°
 C.-feed)]/[100−(% of 370° C.-feed)]

in which
% of 370° C.-effluents=weight content of compounds with boiling points lower than 370° C. in the effluents; and
% of 370° C.-feed=weight content of compounds with boiling points lower than 370° C. in the feed.

The gross selectivity for middle distillate, GS, was defined as:

GS=[(fraction of 150-370effluents)]/[(% of 370°
 C.-effluents)].

The of gas oil yield/kerosene yield (ratio Go./Ker.) in the middle distillate fraction is assumed to be:

ratio Go./Ker.=yield of the fraction(250° C.-370° C.)
 of the effluent/yield of the fraction (150° C.-250°
 C.) in the effluent.

The catalytic performances obtained are given in table 1.

TABLE 1

Catalytic results for once-through hydrocracking at high pressure:

| Catalyst | HSV (h − 1) | temperature to reach 70% of conversion % weight | GS, weight % Middle distillate (MD) |
|---|---|---|---|
| C1 | 0.7 | 395° C. | 73.9 |
| C2 | 0.7 | 394° C. | 73.8 |
| C3 | 0.7 | 393° C. | 73.9 |
| C4 | 0.7 | 398° C. | 71.0 |
| C5 | 0.7 | 395° C. | 73.8 |
| C6 | 0.7 | 394° C. | 73.7 |
| C7 | 0.7 | 392° C. | 73.7 |
| C8 | 0.7 | 398° C. | 71.1 |
| C9 | 0.7 | 397° C. | 73.7 |
| C10 | 0.7 | 400° C. | 73.7 |
| C11 | 0.7 | 395° C. | 73.8 |
| C12 | 0.7 | 396° C. | 73.7 |
| C13 | 0.7 | 397° C. | 73.9 |
| C14 | 0.7 | 398° C. | 73.6 |
| C15 | 0.7 | 398° C. | 73.6 |
| C16 | 0.7 | 398° C. | 73.6 |

The examples show that the insertion of a USY zeolite according to the invention, that the controlled addition of doping phosphorus according to the invention allow a significant activity gain without loss of selectivity in middle distillate.

The catalysts C1 and C5 in accordance with the invention display improved catalytic performances with respect to catalysts C9 and C10 not in accordance with the invention because of their pore volume included in pores with a diameter of more than 500 A respectively assumed to be 0.002 ml/g and 0.33 ml/g. The use of the catalysts C1 and C5 allows the obtaining of 70% of conversion at a lower temperature that the one required by the use of catalysts C9 and C10.

The catalysts C1 and C5 are also particularly adapted for the production of middle distillates according to the invention.

The catalysts C1, C2, C3, C15, C5, C6, C7 and C16 in accordance with the invention display improved catalytic performances with respect to catalysts C4 and C8 not in accordance with the invention because of their lattice parameter a of the unit cell assumed to be 24.53 A.

It is interesting to notice that the catalysts C1, C2, C5 and C6 displaying a lattice parameter a of the unit cell included in the preferred range 24.38.10-10 m and 24.24.10-10 m display improved catalytic performances with respect to catalysts C15 and C16 also in accordance with the invention and are particularly adapted for the production of middle distillates according to the invention.

The catalysts C1, C5, C11, and C12 in accordance with the invention display improved catalytic performances with respect to catalysts C13 and C14 not in accordance with the invention because of their content of doping element respectively assumed to 0% and 6.5% by weight in phosphorus.

The preceding examples thus show the advantages of using a catalyst of the invention to carry out hydrocracking of hydrocarbon feeds. Indeed, the combination of a support combining a silica-alumina with a controlled content in macropores, a Y type zeolite displaying a controlled lattice parameter a of the unit cell and an optimized hydrogenating phase can produce high conversion of the feed and advantageous middle distillate selectivity.

Example 20

Evaluation of the Catalysts C17 and C28 Under Conditions Simulating the Operation of the Second Reactor in a Two Step Hydrocracking Process The feed for the second step was produced by hydrotreating a vacuum distillate on a hydrorefining catalyst sold by Axens in presence of hydrogen, at a temperature of 395° C. and an hourly space velocity of 0.55 h-1. The conversion of 380° C. products was about 50% by weight. After a separation step, the 380° C.+ fraction was recovered and acted as the feed for the second step. The physico-chemical characteristics of said feed are shown in table 2:

TABLE 2

Characteristics of the feed for second step.

| | |
|---|---|
| Density (20/4) | 0.853 |
| Sulphur (wt %) | 2.5 |
| Nitrogen (ppm by weight) | 1.4 |
| Simulated distillation | |
| Initial point | 322° C. |
| Point 5% | 364° C. |
| Point 10% | 383° C. |
| Point 50% | 448° C. |
| Point 90% | 525° C. |
| Final point | 589° C. |

This feed was injected into a second step hydrocracking test unit which comprise a fixed bed reactor with upflow movement of feed into which the catalyst of the invention is introduced. Before injecting the feed, the catalyst was reduced in pure hydrogen at 450° C. for 2 hours. The operating conditions of the test unit were as follows:

| | |
|---|---|
| Total pressure | 14 MPa |
| Catalyst | 50 ml |
| Temperature | 370° C. |
| Hourly space velocity (HSV) h$^{-1}$ | 1.1 |

The catalytic performances obtained under these conditions are described in table 3 of this example.

TABLE 3

Catalytic results.

| Catalyst | HSV (h − 1) | CN 370° C.$^-$, wt % | GS, weight % Middle distillate (MD) |
|---|---|---|---|
| C17 | 1.1 | 80.0 | 71.8 |
| C18 | 1.1 | 78.2 | 72 |

These results thus show the advantage of using a catalyst of the invention to carry out hydrocracking of hydrocarbon feeds. They can produce high conversions of the feed and advantageous middle distillate selectivities.

Example 21

Evaluation of the Catalysts C1 to C16 in a Once-Through Moderate Pressure Hydrocracking (Mild Hydrocracking) of a Vacuum Distillate The catalysts C1 to C16 of which the preparation is described in the examples 1 to 16 are used to realize the once-through moderate pressure hydrocracking (mild hydrocracking) of a vacuum distillate. The main characteristics of the vacuum distillate are given below:

| feed | vacuum distillate |
|---|---|
| Density at 15° C. | 0.9219 |
| Sulphur (wt %) | 2.52 |
| Nitrogen (ppm by weight) | 880 |
| Simulated distillation | |
| DS: 05% p ° C. | 367 |
| DS: 10% p ° C. | 380 |
| DS: 50% p ° C. | 443 |
| DS: 90% p ° C. | 520 |
| DS: Final point ° C. | 690 |

Catalysts C1 to C16 were employed using the process of the invention with a pilot unit comprising 1 fixed traversed bed reactor, the fluids moving from bottom to top (up-flow).

Prior to the hydrocracking test, the catalysts were sulphurized at 120 bars, at 350° C. using a straight run gas oil supplemented with 2% by weight of DMDS.

After sulphurization, the catalytic tests were carried out under the following conditions:

| | | |
|---|---|---|
| Total pressure | 5.5 MPa | T = 405° C. |
| Hourly space velocity (HSV) = | 0.8 h 1. | |

The catalytic performances were expressed as the net conversion into products with a boiling point of less than 370° C., as the net selectivity for middle distillate, 150-370° C. cut, and as the ratio of gas oil yield/kerosene yield in the middle distillate fraction. They were derived from the results for simulated distillation and the definitions are identical as the ones given in the example 19.

The catalytic performances obtained are given in the table 4.

TABLE 4

Catalytic results un mild hydrocracking at moderate pressure.

| Catalyst | HSV (h$^{-1}$) | CN 370° C.$^-$ % by weight | GS, weight % Middle distillate (MD) |
|---|---|---|---|
| C1 | 0.8 | 49.8 | 81.2 |
| C2 | 0.8 | 49.8 | 80.9 |
| C3 | 0.8 | 49.9 | 80.8 |
| C4 | 0.8 | 48.0 | 78.0 |
| C5 | 0.8 | 49.6 | 81.2 |
| C6 | 0.8 | 49.8 | 80.9 |
| C7 | 0.8 | 50.0 | 80.7 |
| C8 | 0.8 | 48.1 | 78.1 |
| C9 | 0.8 | 48.1 | 80.6 |
| C10 | 0.8 | 47.0 | 80.7 |
| C11 | 0.8 | 49.5 | 81.2 |
| C12 | 0.8 | 49.6 | 81.1 |
| C13 | 0.8 | 49 | 80.5 |
| C14 | 0.8 | 49.1 | 80.6 |
| C15 | 0.8 | 48 | 80.5 |
| C16 | 0.8 | 48 | 80.5 |

The interpretation of the results of the table 4 thus shows, as for the interpretation of the results of table 1, the advantage of using a catalyst of the invention to carry out hydrocracking of hydrocarbon feeds. Indeed, the combination of a support combining a silica-alumina with a controlled content in macropores, a Y type zeolite displaying a controlled lattice parameter a of the unit cell and an optimized hydrogenating phase can produce high conversion of the feed and advantageous middle distillate selectivity.

The invention claimed is:

1. A catalyst comprising at least one hydrodehydrogenating element selected from the group formed by elements from group VIB and group VIII of the periodic table, 0.5% to 2.5% by weight of a phosphorus doping element and a support based on zeolite Y defined by a lattice parameter a of the unit cell in the range $24.40 \times 10^{-10}$ m to $24.15 \times 10^{-10}$ m and based on silica-alumina containing a quantity of more than 5% by weight and 95% by weight or less of silica ($SiO_2$), said catalyst having the following characteristics:
   a mean pore diameter, measured by mercury porosimetry, in the range 20 Å to 140 Å;
   a total pore volume, measured by mercury porosimetry, in the range 0.1 ml/g to 0.5 ml/g;
   a total pore volume, measured by nitrogen porosimetry, in the range 0.1 ml/g to 0.5 ml/g;
   a BET specific surface area in the range 100 to 600 $m^2/g$;
   a pore volume, measured by mercury porosimetry, included in pores with a diameter of more than 140 Å, of less than 0.1 ml/g;
   a pore volume, measured by mercury porosimetry, included in pores with a diameter of more than 160 Å, of less than 0.1 ml/g;
   a pore volume, measured by mercury porosimetry, included in pores with a diameter of more than 200 Å, of less than 0.1 ml/g;
   a pore volume, measured by mercury porosimetry, included in pores with a diameter of more than 500 Å, is greater than 0.02 ml/g and lower than 0.07 ml/g;
   an X ray diffraction diagram which contains at least the characteristic principal peaks of at least one transition alumina included in the group composed of alpha, rho, khi, eta, gamma, kappa, theta and delta aluminas;
   a catalyst settled packing density of more than 0.75 $g/cm^3$.

2. A catalyst according to claim 1, in which the pore volume, measured by mercury porosimetry, included in pores with diameter of more than 500 Å, is greater than 0.03 ml/g and lower than 0.07 ml/g.

3. A catalyst according to claim 1, based on molybdenum and tungsten.

4. A catalyst according to claim 1, based on nickel and tungsten.

5. A catalyst according to claim 1, containing 0.1% to 30% by weight of said Y zeolite.

6. A catalyst according to claim 1, in which the support is based on said Y zeolite defined by a lattice parameter a of the unit cell in the range $24.38 \times 10^{-10}$ m to $24.24 \times 10^{-10}$ m.

7. A catalyst according to claim 1, which comprises at least one element from group VIIB.

8. A catalyst according to claim 1, which comprises at least one element from group VB.

9. A catalyst according to claim 1, with a pore distribution such that the ratio between the volume V2, measured by mercury porosimetry, included between $D_{mean}-30$ Å and $D_{mean}+30$ Å to the total pore volume, measured by mercury porosimetry, is more than 0.6; the volume V3, measured by mercury porosimetry, included in pores with a diameter of more than $D_{mean}+30$ Å, is less than 0.1 ml/g; the volume V6, measured by mercury porosimetry, included in pores with a diameter of more than $D_{mean}+15$ Å, is less than 0.2 ml/g.

10. A catalyst according to claim 1, in which the X ray diffraction diagram contains at least the characteristic principal peaks of at least one of the transition aluminas included in the group composed of eta, theta, delta and gamma aluminas.

11. A catalyst according to claim 1, in which the BET surface area is less than 350 $m^2/g$.

12. A catalyst according to claim 1, comprising a minor proportion of at least one stabilizing element selected from the group formed by zirconium and titanium.

13. A process comprising catalytically hydrocracking and/or hydroconversion of hydrocarbon feeds wherein the catalyst is according to claim 1.

14. A hydrocracking and/or hydroconversion process according to claim 13, carried out using a once-through process.

15. A hydrocracking and/or hydroconversion process according to claim 13, comprising at least one first hydrorefining reaction zone and at least one second reaction zone comprising hydrocracking at least a portion of the effluent from the first zone and comprising incomplete separation of ammonia from the effluent leaving the first zone.

16. A hydrocracking and/or hydroconversion process according to claim 13, comprising:
   a first hydrorefining reaction zone, in which the feed is brought into contact with at least one hydrorefining catalyst having, in the standard activity test, a degree of cyclohexane conversion of less than 10% by weight;
   a second hydrocracking reaction zone, in which at least a portion of the effluent from the hydrorefining step is brought into contact with at least one zeolitic hydrocracking catalyst having, in the standard activity test, a degree of cyclohexane conversion of more than 10% by weight.

17. A hydrocracking and/or hydroconversion process according to claim 13, in a two-step process.

18. A process according to claim 13 operating in the presence of hydrogen, at a temperature of more than 200° C., at a pressure of more than 1 MPa, the space velocity being in the range 0.1 to 20 $h^{-1}$ and the quantity of hydrogen introduced being such that the ratio of the liters of hydrogen/liters of hydrocarbon is in the range 80 to 5000 l/l by volume.

19. A hydrocracking and/or hydroconversion process according to claim 13, operated at a pressure in the range 2 to 6 MPa and resulting in conversions of below 40%.

20. A process according to claim 13, operating in fixed bed mode.

21. A process according to claim 13, operating as an ebullated bed.

22. A process for the comprising conducting a hydrotreatment of hydrocarbon feeds wherein the catalyst is according to claim 1.

23. A process according to claim 22, placed upstream of a catalytic hydrocracking process.

24. A process according to claim 23, in which the hydrocracking catalyst is based on a zeolite.

25. A process according to claim 23, in which the hydrocracking catalyst is based on alumina-silica.

26. A process according to claim 22, in which the hydrocracking catalyst is based on nickel and tungsten.

27. A process according to claim 13, in which the hydrocarbon feeds are selected from the group formed by LCO (light cycle oil), atmospheric distillates, vacuum distillates, feeds from units for extracting aromatics from lubricating oil bases or from solvent dewaxing of lubricating oil bases, distillates from processes for fixed bed or ebullated bed desulphurization or hydroconversion of RA (atmospheric residues) and/or VR (vacuum residues) and/or deasphalted oils, or deasphalted oils, used alone or as a mixture.

28. A process according to claim 13, in which the feed initially passes over a bed of catalyst or adsorbent which is different from the hydrocracking/hydroconversion or hydrotreatment catalyst.

29. A catalyst according to claim 7, which comprises at least one element from group VB.

30. A catalyst according to claim 1, wherein said zeolite Y consists essentially of a USY zeolite.

* * * * *

UNITED STATES PATENT AND TRADEMARK OFFICE
CERTIFICATE OF CORRECTION

PATENT NO.         : 8,002,970 B2
APPLICATION NO.    : 11/722610
DATED              : August 23, 2011
INVENTOR(S)        : Patrick Euzen et al.

It is certified that error appears in the above-identified patent and that said Letters Patent is hereby corrected as shown below:

Column 56, line 1 reads: "A process comprising catalytically hydrocracking and/" should read --In a process comprising catalytically hydrocracking and/--.

Column 56, line 38 reads: "A process for the comprising conducting a hydrotreat-" should read --In a process comprising conducting a hydrotreat- --.

Signed and Sealed this
Tenth Day of January, 2012

David J. Kappos
*Director of the United States Patent and Trademark Office*